US012761466B2

(12) United States Patent
Otsuka et al.

(10) Patent No.: US 12,761,466 B2
(45) Date of Patent: Oct. 13, 2026

(54) ROTARY RECIPROCATING DRIVE ACTUATOR

(71) Applicants: Yuki Otsuka, Tokyo (JP); Yasutaka Kitamura, Tokyo (JP); Masaharu Kagami, Tokyo (JP); Yuki Takahashi, Tokyo (JP); Kai Masamoto, Tokyo (JP)

(72) Inventors: Yuki Otsuka, Tokyo (JP); Yasutaka Kitamura, Tokyo (JP); Masaharu Kagami, Tokyo (JP); Yuki Takahashi, Tokyo (JP); Kai Masamoto, Tokyo (JP)

(73) Assignee: MITSUMI ELECTRIC CO., LTD., Tokyo (JP)

( * ) Notice: Subject to any disclaimer, the term of this patent is extended or adjusted under 35 U.S.C. 154(b) by 369 days.

(21) Appl. No.: 18/343,872

(22) Filed: Jun. 29, 2023

(65) Prior Publication Data

US 2024/0019683 A1 Jan. 18, 2024

(30) Foreign Application Priority Data

Jul. 15, 2022 (JP) ................................ 2022-114256
Jul. 25, 2022 (JP) ................................ 2022-118083

(51) Int. Cl.
*G02B 26/08* (2006.01)
*G02B 26/10* (2006.01)
*H02K 33/16* (2006.01)

(52) U.S. Cl.
CPC ......... *G02B 26/0816* (2013.01); *H02K 33/16* (2013.01); *G02B 26/10* (2013.01)

(58) Field of Classification Search
CPC ............................ H02K 5/1732; H02K 5/225
See application file for complete search history.

(56) References Cited

U.S. PATENT DOCUMENTS

2008/0036309 A1 2/2008 Toyama
2016/0233753 A1 8/2016 Benner, Jr.
(Continued)

FOREIGN PATENT DOCUMENTS

DE 202019002282 U1 10/2019
DE 20-2019002282 * 11/2019 .............. H02K 1/00
(Continued)

OTHER PUBLICATIONS

Extended European Search Report dated Dec. 8, 2023.
(Continued)

*Primary Examiner* — Lauren Nguyen
(74) *Attorney, Agent, or Firm* — Shih IP Law Group, PLLC.

(57) ABSTRACT

A rotary reciprocating drive actuator includes: a movable body including a shaft part to which a magnet is fixed and being capable of performing a reciprocating rotation around an axis; a base portion including a pair of wall portions for supporting the shaft part via a bearing such that the shaft part is rotatable; a core assembly including: a core body having a plurality of magnetic poles facing an outer circumference of the magnet to sandwich the magnet, a coil body wound around the core body and energized to cause a reciprocating rotation of the movable body, and a magnet position holding portion generating a magnetic attraction force between the magnet position holding portion and the magnet to define a reference position of the reciprocating rotation; and a preload applying part externally fitted to the shaft part and configured to apply a preload to the bearing.

6 Claims, 24 Drawing Sheets

(56) References Cited

U.S. PATENT DOCUMENTS

| | | | | |
|---|---|---|---|---|
| 2019/0296627 | A1 | 9/2019 | Takahashi | |
| 2021/0184554 | A1* | 6/2021 | Takahashi | H02K 33/12 |
| 2021/0273543 | A1 | 9/2021 | Takahashi | |
| 2022/0043255 | A1 | 2/2022 | Kitamura | |
| 2023/0026476 | A1 | 1/2023 | Takahashi | |

FOREIGN PATENT DOCUMENTS

| | | | | | |
|---|---|---|---|---|---|
| JP | 11-146627 | A | | 5/1999 | |
| JP | 11-206093 | A | | 7/1999 | |
| JP | H-11-206093 | | * | 7/1999 | H02K 32/02 |
| JP | 2001-211604 | A | | 8/2001 | |
| JP | 2006-227415 | A | | 8/2006 | |
| JP | 2008-043133 | A | | 2/2008 | |
| JP | 4727509 | B2 | | 7/2011 | |
| JP | 2019-170118 | A | | 10/2019 | |
| JP | 2020-006344 | A | | 1/2020 | |
| JP | 2021-097443 | A | | 6/2021 | |
| JP | 2022-030904 | A | | 2/2022 | |
| WO | 2021117863 | A1 | | 6/2021 | |

OTHER PUBLICATIONS

Notice of the Reasons for Rejection for Japanese Application No. 2022114256, dated Nov. 4, 2025.
Notice of the Reasons for Rejection for Japanese Patent Application No. 2022118083 dated Nov. 4, 2025.

* cited by examiner

ROTARY RECIPROCATING DRIVE ACTUATOR

CROSS REFERENCE TO RELATED APPLICATIONS

This application is entitled to (or claims) the benefit of Japanese Patent Application No. 2022-114256, filed on Jul. 15, 2022, and Japanese Patent Application No. 2022-118083, filed on Jul. 25, 2022, the disclosure of which including the specification, drawings and abstract is incorporated herein by reference in its entirety.

TECHNICAL FIELD

The present invention relates to a rotary reciprocating drive actuator.

BACKGROUND ART

Conventionally, a rotary reciprocating drive actuator is used as an actuator used in an optical scanning apparatus such as a multifunctional machine, a laser beam printer, or the like. Specifically, the rotary reciprocating drive actuator causes a reciprocating rotation of the mirror of the scanner to change a reflection angle of a laser beam to achieve optical scanning of an object.

Patent literature (hereinafter, referred to as "PTL") 1 discloses a galvanometer motor as this type of rotary reciprocating drive actuator. As galvanometer motors, various types of galvanometer motors are known in addition to the type of galvanometer motor with the structure disclosed in PTL 1 and a galvanometer motor of a movable coil type in which a coil is attached to a mirror.

PTL 1 discloses a beam scanner in which four permanent magnets are disposed on a rotation shaft to which the mirror is attached, such that the permanent magnets are magnetized in the radial direction of the rotation shaft, and in which cores that have magnetic poles and around which a coil is wound are disposed to sandwich the rotation shaft.

CITATION LIST

Patent Literature

PTL 1: U.S. Pat. No. 4,727,509

SUMMARY OF INVENTION

Technical Problem

Meanwhile, in the beam scanner of PTL 1, the rotation shaft to which the mirror is attached is rotatably supported via bearings between a pair of wall-shaped bearing holders that extend upright from a fixed base. In the beam scanner having such a configuration, there is a demand for a rotary reciprocating drive actuator that has an increased rotational accuracy of the rotation shaft with respect to the bearings and that performs more stable rotary reciprocating drive.

An object of the present invention is to provide a rotary reciprocating drive actuator that has high rotational accuracy and can perform highly reliable driving with little sliding by improving the rigidity of the shaft.

Solution to Problem

To achieve the above object, the present invention employs a configuration including:

- a movable body including a shaft part to which a magnet is fixed at an outer circumference of the shaft part, the movable body being capable of performing a reciprocating rotation about an axis;
- a base portion including a pair of wall portions for supporting the shaft part via a bearing such that the shaft part is rotatable;
- a core assembly including: a core body having a plurality of magnetic poles facing an outer circumference of the magnet to sandwich the magnet, a coil body that is wound around the core body and that is energized to generate a magnetic flux interacting with the magnet to cause a reciprocating rotation of the movable body, and a magnet position holding portion that generates a magnetic attraction force between the magnet position holding portion and the magnet to define a reference position of the reciprocating rotation; and
- a preload applying part that is externally fitted to the shaft part and is configured to apply a preload to the bearing.

Advantageous Effects of Invention

According to the present invention, it is possible to improve the rotational accuracy and to perform highly reliable driving with little sliding by improving the rigidity of a shaft.

DESCRIPTION OF EMBODIMENTS

Hereinafter, embodiments of the present invention will be described with reference to the drawings.

Figure 1:
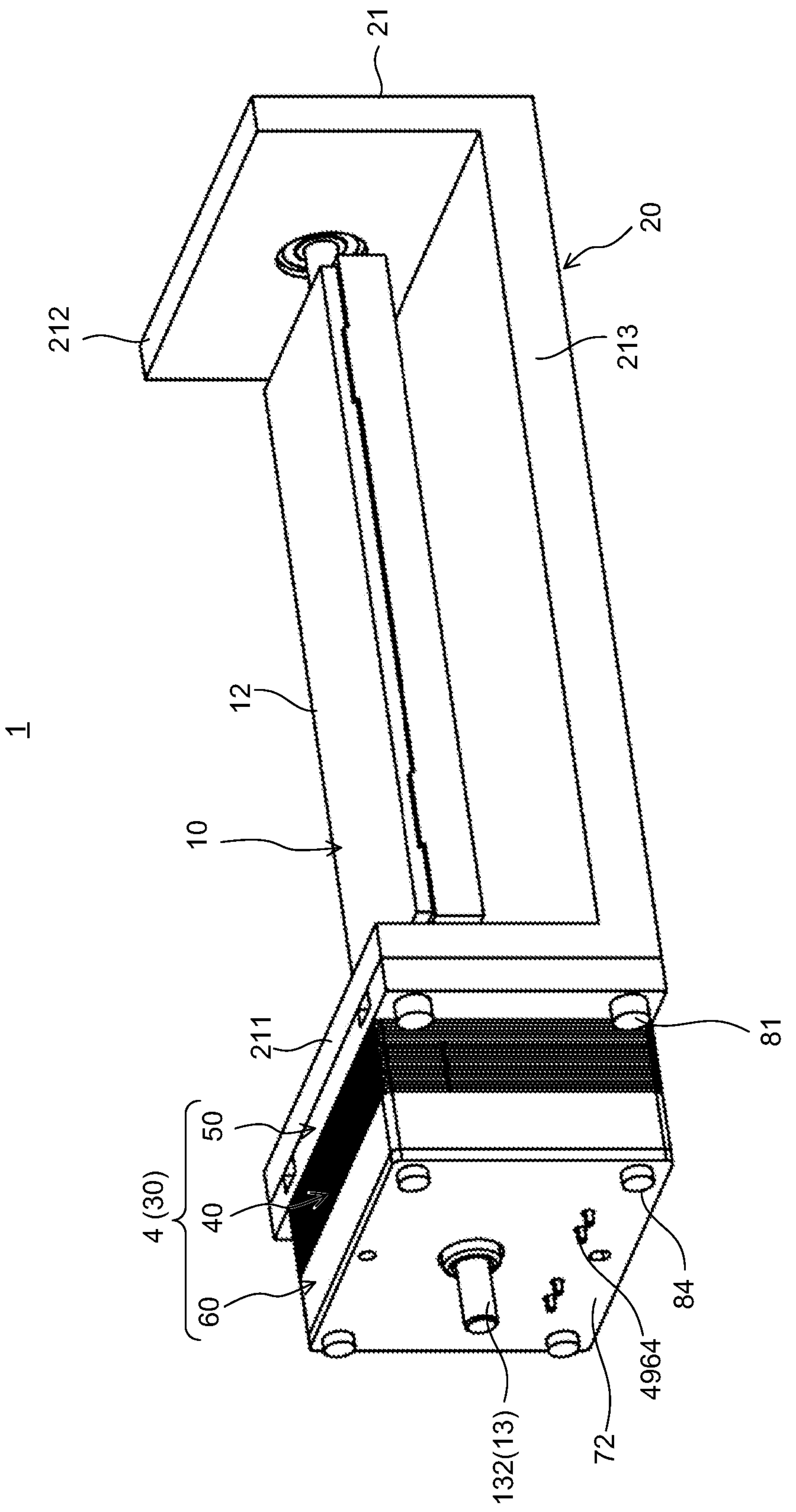
FIG. 1 is an external perspective view of a rotary reciprocating drive actuator according to Embodiment 1 of the present invention.
Figure 2:
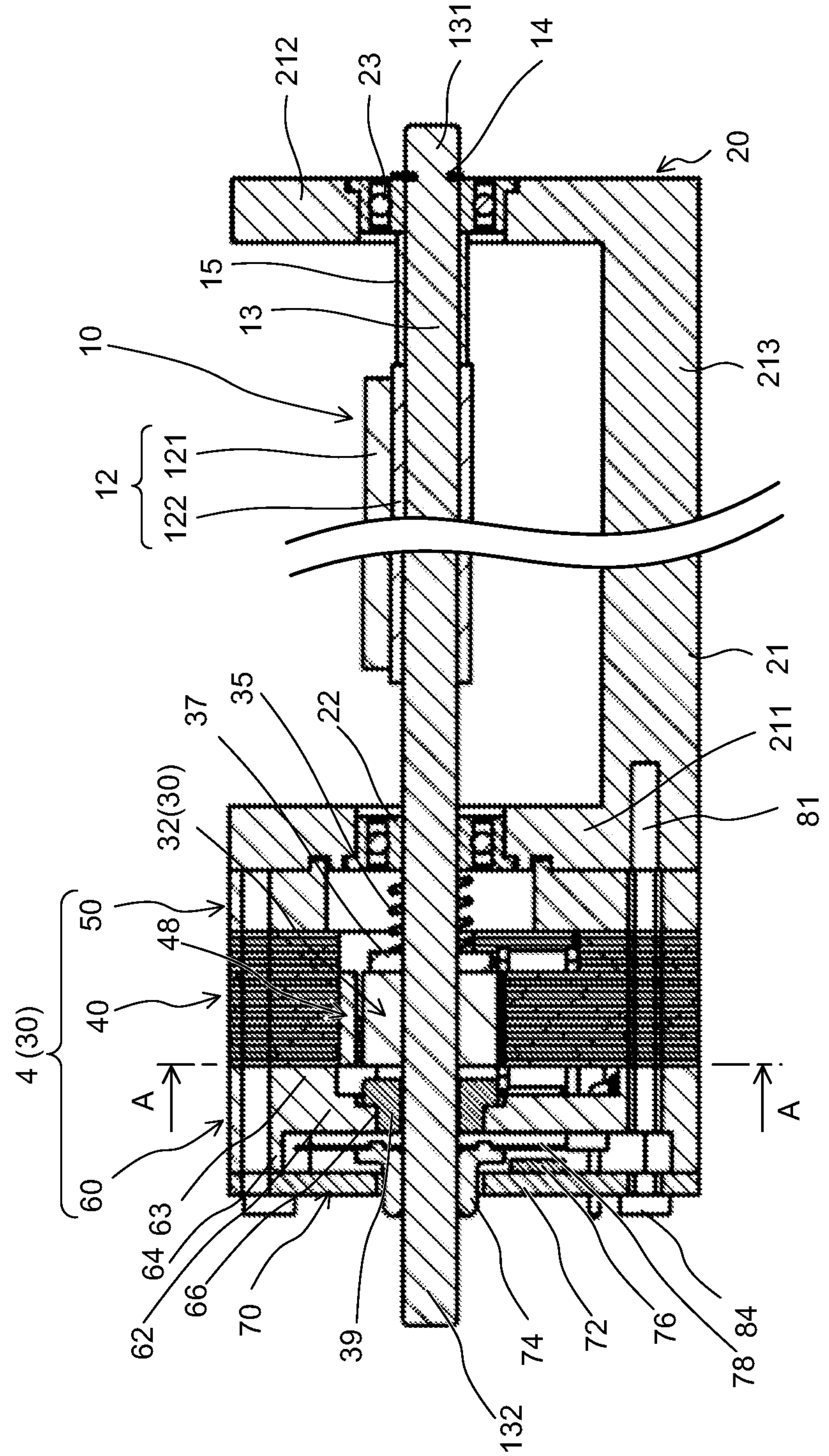
FIG. 2 is a longitudinal sectional view along the axial center of the rotary reciprocating drive actuator.
Figure 3:
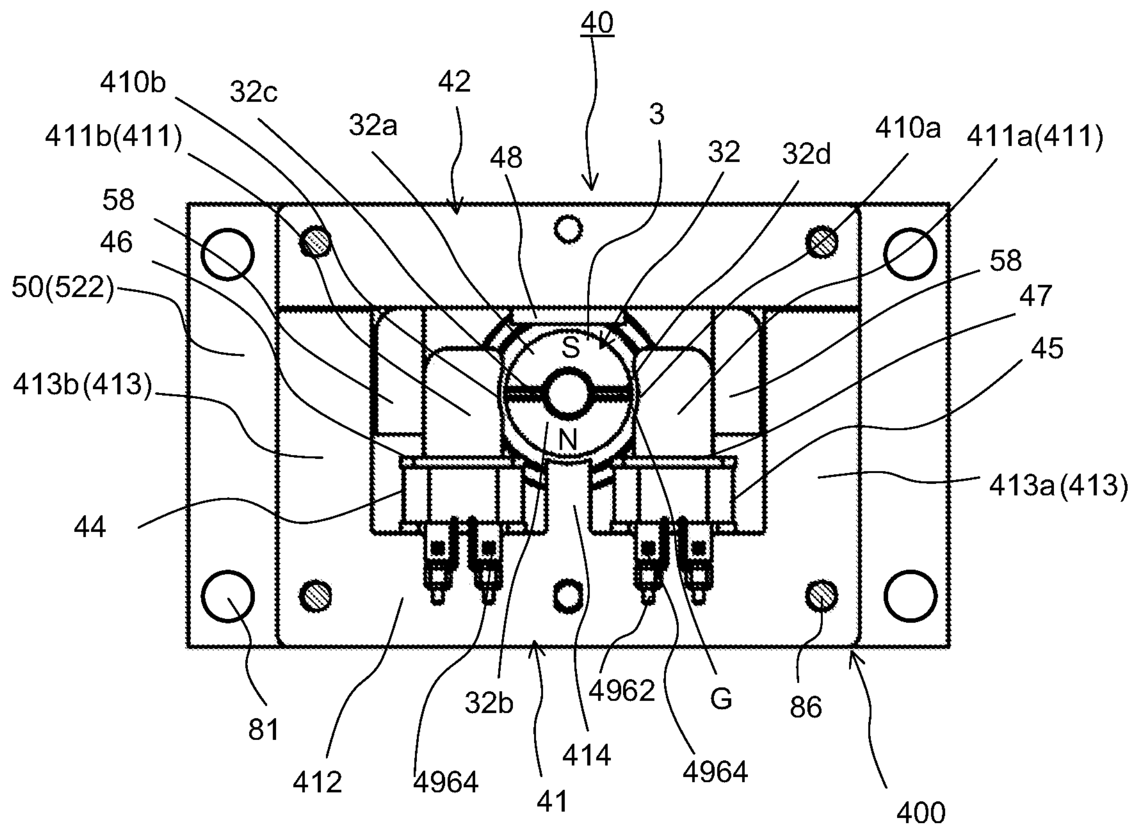
FIG. 3 is an end view of a part at line A-A in FIG. 2 in which a left member is removed from the front end face of a driving unit.
Figure 4:
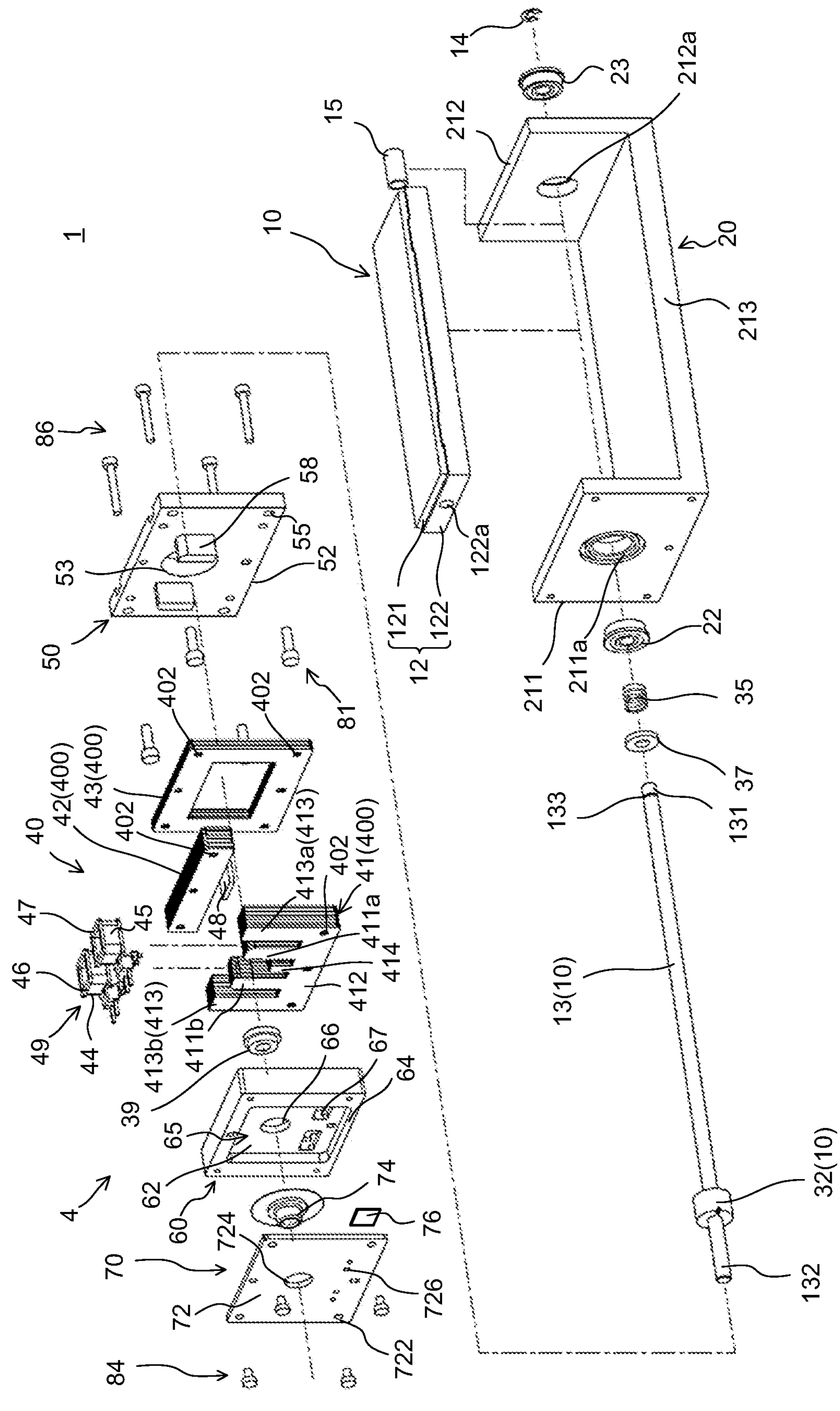
FIG. 4 is an exploded perspective view of the rotary reciprocating drive actuator.

FIG. 1 is an external perspective view of rotary reciprocating drive actuator 1 according to Embodiment 1 of the present invention, and FIG. 2 is a longitudinal sectional view taken along an axial center of rotary reciprocating drive actuator 1. Further, FIG. 3 is an end view of a part at line A-A in FIG. 2 in which a left member is removed from the front end face of driving unit 4 such that the inside of driving unit 4 can be seen, and FIG. 4 is an exploded perspective view of rotary reciprocating drive actuator 1.

Rotary reciprocating drive actuator 1 is used, for example, in a Laser Imaging Detection and Ranging (LiDAR) apparatus. Note that, rotary reciprocating drive actuator 1 is also applicable to an optical scanning apparatus such as a multifunctional machine, a laser beam printer, or the like.

Rotary reciprocating drive actuator 1 broadly includes movable body 10, base portion 21 that rotatably supports movable body 10, and driving unit 4 that drives a reciprocating rotation of movable body 10 with respect to base portion 21. Base portion 21 and driving unit 4 constitute fixing body 20 that supports movable body 10 such that the reciprocating rotation of movable body 10 is capable of being driven.

Further, in rotary reciprocating drive actuator 1, movable body 10 is attached to base portion 21 to form main body unit 2, and rotary reciprocating drive actuator 1 includes driving unit 4 at one end portion of main body unit 2.

Figure 5:
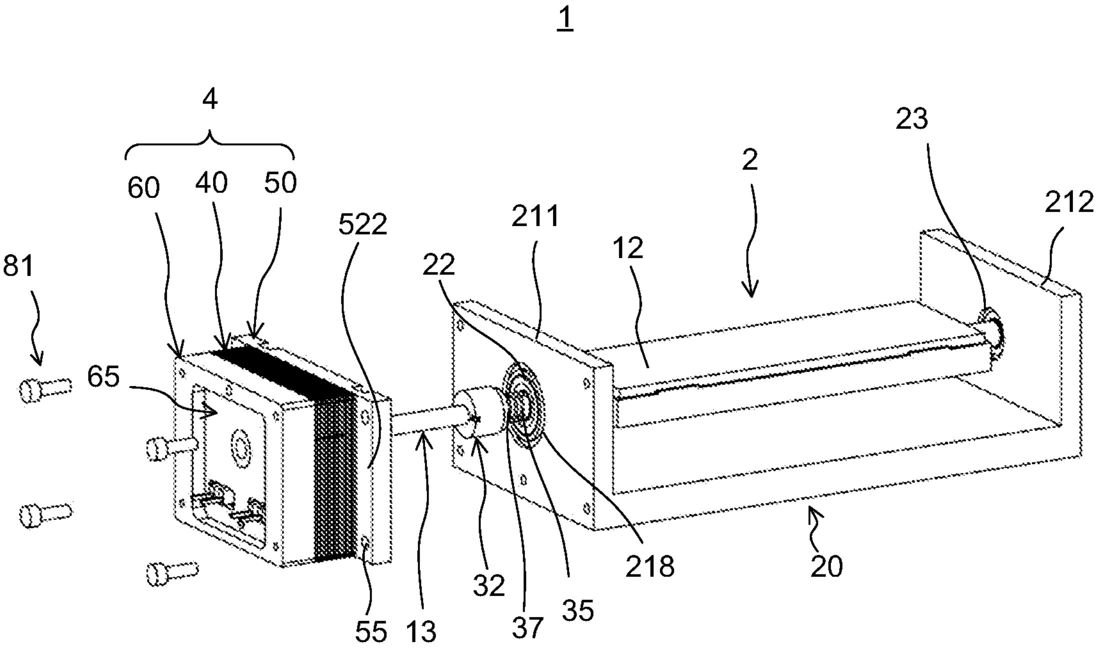
FIG. 5 is a front side perspective view of a state in which the driving unit is removed from a main body unit.
Figure 6:
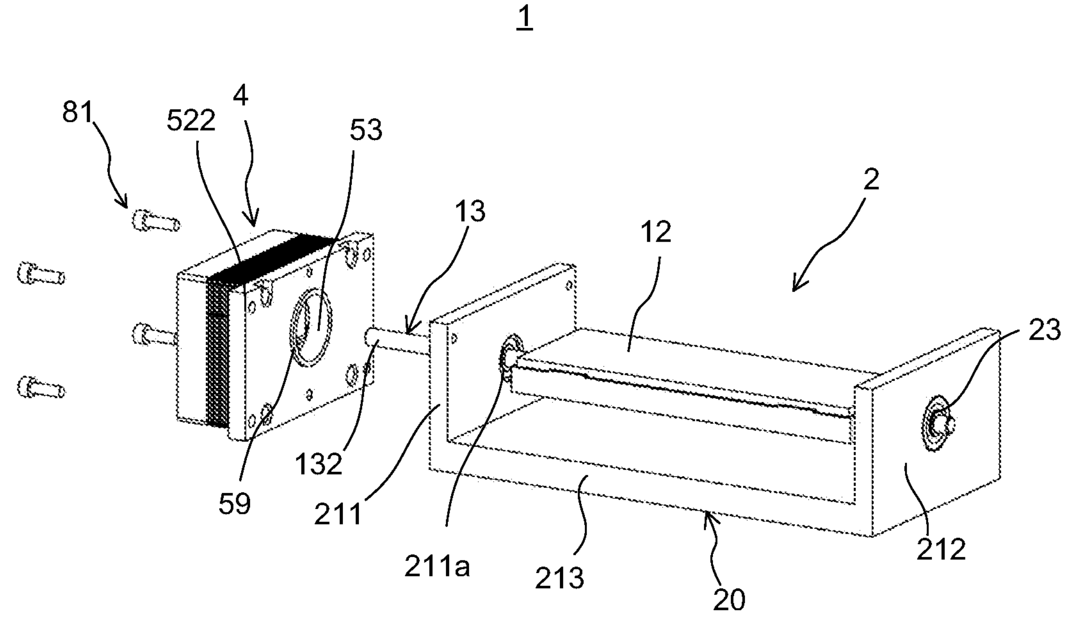
FIG. 6 is a rear side perspective view of a state in which the driving unit is removed from the main body unit.

FIG. 5 is a front perspective view of a state in which driving unit 4 is removed from main body unit 2, and FIG. 6 is a rear perspective view of a state in which driving unit 4 is removed from main body unit 2.

As illustrated in FIGS. 5 and 6, main body unit 2 in which movable body 10 is attached to base portion 21 and driving unit 4 are attached by fastening members 81. Note that fastening members 81 may be any members as long as both of the units can be fixed, but for example, an external screw such as a small screw or a screw and/or a bolt nut may be used.

Movable body 10 includes rotation shaft 13, mirror part 12, and movable magnet (hereinafter, simply referred to as "magnet") 32. Details of magnet 32 will be described in detail together with driving unit 4 described later.

Mirror part 12 is a movable object in rotary reciprocating drive actuator 1, and is connected to rotation shaft 13. Mirror part 12 is formed, for example, by attaching mirror 121 to one surface of mirror holder 122. Rotation shaft 13 is inserted into and fixed to insertion hole 122*a* of mirror holder 122. Mirror part 12 reflects scanning light.

Figure 7:
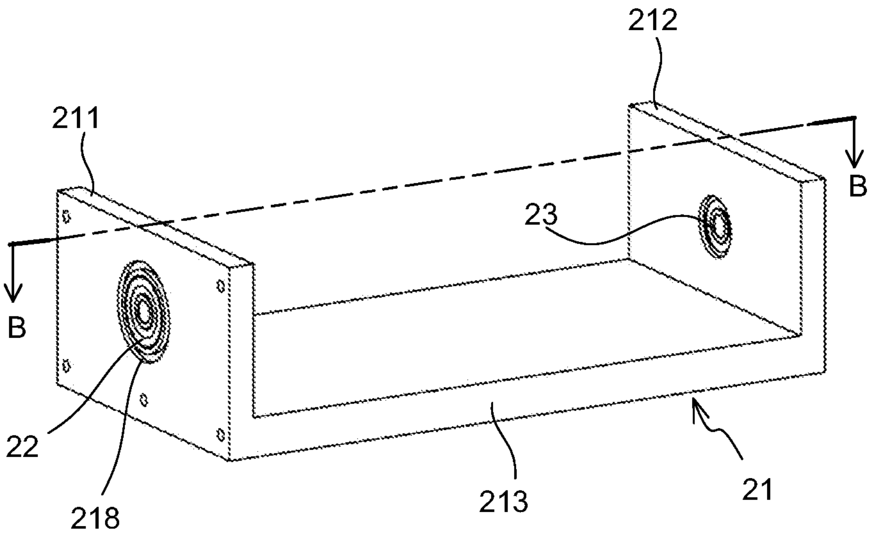
FIG. 7 is a perspective view of the main body unit.
Figure 8:
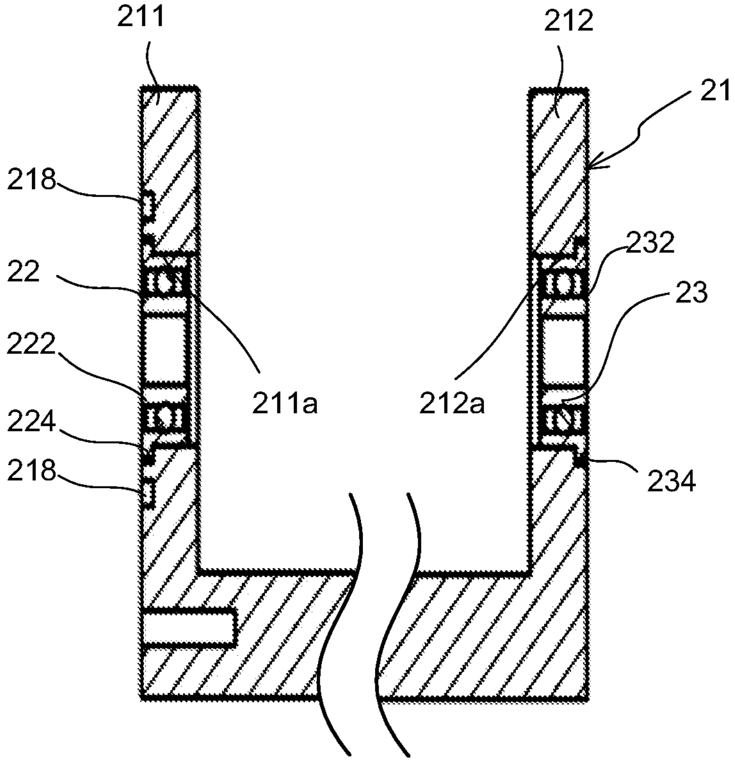
FIG. 8 is a sectional view taken along line B-B of FIG. 7.

FIG. 7 is a perspective view of the main body unit, and FIG. 8 is a sectional view taken along line B-B in FIG. 7.

As illustrated in FIGS. 4 to 8, base portion 21 has flat bottom portion 213 and a pair of wall portions 211 and 212 spaced apart from each other. Bottom portion 213 has a flat plate shape and is disposed to extend in the axial direction, and a pair of wall portions 211 and 212 are disposed upright on the opposite ends of the bottom portion so as to face each other. Base portion 21 is formed with a substantially U-shaped section by bottom portion 213 and the pair of wall portions 211 and 212.

Each of the pair of wall portions 211 and 212 has a rectangular plate shape, and insertion holes 211*a* and 212*a* are formed in the central portions thereof. Bearings 22 and 23 are internally fitted into insertion holes 211*a* and 212*a*, and rotation shaft 13 is inserted into bearings 22 and 23.

In addition, insertion holes 211*a* and 212*a* are, at the axially outer opening edge portions, provided respectively with spot-facing portions having a diameter larger than that of penetrating portions. Flanges 224 and 234 of bearings 22 and 23 are fitted to the spot-facing portions.

In bearings 22 and 23, flanges 224 and 234 are disposed at the opening edges on one sides of doughnut-shaped bearing main bodies 222 and 232. Bearings 22 and 23 are fitted to wall portions 211 and 212 of base portion 21 from the axially outer side, and accordingly, flanges 224 and 234 are fitted to the spot-facing portions. Bearings 22 and 23 are fixed to base portion 21 in a state in which bearings 22 and 23 are prevented from coming off in the fitting direction.

As a result, bearing main bodies 222 and 232 of bearings 22 and 23 do not protrude outward from wall portions 211 and 212 with respect to base portion 21, and wall portions 211 and 212 of base portion 21 can be made thinner, thereby reducing the overall length of rotary reciprocating drive actuator 1.

Further, flanges 224 and 234 of bearings 22 and 23 are fitted to the spot-facing portions of insertion holes 211*a* and 212*a* on the axially outer side (the outer surface side of wall portions 211 and 212). Thus, during the assembly of main body unit 2, the fitting state of flanges 224 and 234 fitted to insertion holes 211*a* and 212*a* can be easily visually recognized and measured from the outer side of wall portions 211 and 212.

Bearings 22 and 23 may be composed of rolling bearings (for example, ball bearings) or plain bearings for base portion 21. For example, when bearings 22 and 23 are rolling bearings, the friction coefficient is low, and rotation shaft 13 can be smoothly rotated. Thus, the driving performance of rotary reciprocating drive actuator 1 is improved. Thus, rotation shaft 13 is rotatably attached to base portion 21 via bearings 22 and 23, and mirror part 12, which is a movable object, is disposed between the pair of wall portions 211 and 212.

Rotation shaft 13 is inserted into bearings 22 and 23, and the opposite end portions of rotation shaft 13 protrude outward from bearings 22 and 23 in the axial direction. Bearings 22 and 23 support rotation shaft 13 on base portion 21 around the axis such that the rotation shaft is rotatable.

Mirror part 12 which is a movable target is fixed to a portion of rotation shaft 13 on the one end portion side inserted to extend between the pair of wall portions 211 and 212 of base portion 21, and magnet 32 is fixed to the other end portion 132 side of rotation shaft 13. Thus, rotation shaft 13 is supported by the pair of wall portions 211 and 212 of base portion 21. Since base portion 21 supports mirror part 12 disposed between the pair of wall portions 211 and 212 from opposite sides via rotation shaft 13, the mirror part can be supported more firmly than can be supported by the configuration for supporting mirror part 12 by the rotation shaft supported by a cantilever. Thus, impact resistance and vibration resistance are enhanced.

One end portion side of rotation shaft 13 is connected to mirror part (movable object) 12 between the pair of wall portions 211 and 212, and the other end portion 132 side of rotation shaft 13 is inserted through bearing (ball bearing) 22 of one wall portion 211 of the pair of wall portions 211 and 212 and is fixed to magnet 32 outside one wall portion 211.

Magnet 32 is disposed in driving unit 4, which will be described later, and is reciprocally rotationally driven by a magnetic flux generated by driving unit 4. Rotation shaft 13 causes a reciprocating rotation of mirror part 12 by electromagnetic interaction between driving unit 4 and magnet 32.

Retaining portion (retaining ring) 14 is fitted into fitting groove 133 in one end portion 131 of rotation shaft 13 protruding to the outside of bearing 23, and movement of rotation shaft 13 toward the other end portion 132 side is restricted by retaining portion 14.

Cylindrical stopper portion 15 is externally fitted to a portion of rotation shaft 13 between mirror holder 122 of mirror part 12 and wall portion 212 of the pair of wall portions on the side of one end portion 131.

Stopper portion 15 is fixed to rotation shaft 13. Movement of rotation shaft 13 toward the one end portion 131 side is restricted by bearing 23, and movement of rotation shaft 13 toward the other end portion 132 side is restricted by retaining portion 14. Mirror part 12 fixed to rotation shaft 13 is restricted via retaining portion 14 from moving to the other end portion 132 side in the axial direction with respect to base portion 21.

Via mirror part 12, stopper portion 15 prevents rotation shaft 13 from coming off bearing 23 toward the one end portion side, that is, on the outside in the axial direction.

Stopper portion 15, together with retaining portion 14, restricts the axial movement of movable body 10 including mirror part 12, rotation shaft 13, and magnet 32 within a predetermined range including tolerances and the like. The movable body is prevented from coming off base portion 21.

Rotation shaft 13 is disposed on base portion 21 such that the other end portion 132 side of base portion 21 protrudes from wall portion 211 to the outside of base portion 21 through bearing 22. A portion protruding from wall portion 211 is inserted through driving unit 4.

Magnet 32 fixed to the other end portion 132 side of rotation shaft 13 is disposed at the portion protruding outward from wall portion 211 of base portion 21.

Preload spring (preload applying part) 35, annular receiving portion (annular retaining portion) 37, and magnet 32 are disposed on the portion of rotation shaft 13 protruding from wall portion 211 toward the other end portion 132 side in this order from the wall portion 211 side.

Preload spring 35 extends and contracts in the axial direction to bias bearing 22 in the axial direction. In particular, preload spring 35 is disposed between bearing 22, which is a ball bearing, and magnet 32 in one wall portion 211.

Figure 9:
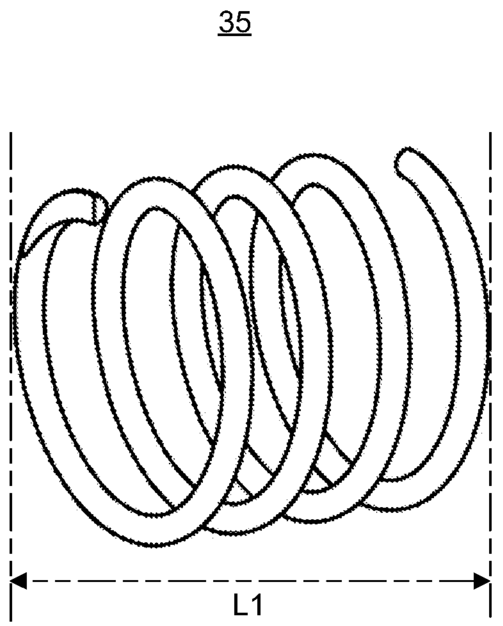
FIG. 9 is an enlarged view of a preload spring.

As illustrated in FIG. 9, preload spring 35 is, for example, a cylindrical coil spring having predetermined length L1 corresponding to a space in which preload spring 35 is disposed, and having flat surfaces formed at both ends thereof spaced apart in a predetermined length direction.

Preload spring 35 is disposed to be externally fitted to rotation shaft 13, and biases magnet 32 in a direction away from bearing 22 fitted in wall portion 211.

Preload spring 35 is interposed between annular receiving portion 37 adjacent to magnet 32 and bearing 22 in a state in which rotation shaft 13 is inserted.

Preload spring 35 applies a constant pressure preload to bearing 22. As a result, even when fluctuations in the load applied to rotation shaft 13, expansion and contraction of rotation shaft 13 due to a temperature difference between rotation shaft 13 and base portion 21 during rotation, or the like occur, it can be absorbed by preload spring 35, and the fluctuation of the preload amount to bearing 22 can be reduced, whereby a steady preload amount can be obtained. Therefore, preload spring 35 is capable of preventing the vibration of rotation shaft 13 in the axial direction due to the high-speed rotation of rotation shaft 13, and achieving rotary drive at a higher speed than with a predetermined position preload, thereby preventing the vibration in the axial direction.

Preload spring 35 applies a preload to bearings (in particular, ball bearings) 22 and 23, thereby maintaining the low slidability and the high reliability of the rotational driving of rotation shaft 13 and enabling stable driving.

It is preferable that preload spring 35 be configured to be in contact with a component that is firmly fixed, and to receive a preload from the component. Annular receiving portion 37 is a press-fitting ring, and is fixed to rotation shaft 13 by being press-fitted to an outer circumferential portion of rotation shaft 13 with respect to rotation shaft 13.

Annular receiving portion 37 receives one end portion of preload spring 35 which makes contact with bearing 22 at one end portion side, thereby preventing direct impact from being applied to magnet 32 which is an adhesively fixed component. As a result, it is possible to prevent an unnecessary force from being applied to magnet 32, and to improve reliability.

Further, since preload spring 35 is disposed inside rotary reciprocating drive actuator 1, it is possible to ensure a design for a steady preload not affected from the outside of rotary reciprocating drive actuator 1.

Note that for preload spring 35, a wave spring which has a shape obtained by spirally or annularly coiling a plate-shaped steel wire and by adding waves to the wire may also be used as a spring having a low height in an extension-contraction direction (i.e., having a low height as a spring), instead of a cylindrical coil spring obtained by spirally coiling a round steel wire.

Figure 10:
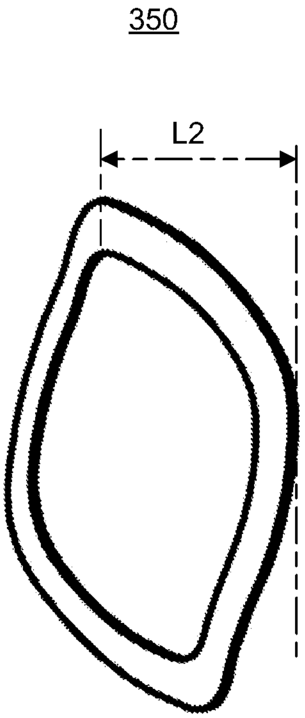
FIG. 10 illustrates a wave spring which is a variation of the preload spring.

For example, preload spring 350 as the wave spring illustrated in FIG. 10 may be used as preload spring 350 having a length in the axial direction shorter than length L1 of the cylindrical coil spring in the axial direction as preload spring 35.

In preload spring 350, which is a wave spring, length L2 in the axial direction, which is the extension-contraction direction, is shorter than length L1 of the cylindrical coil spring.

When length L0 between wall portion 211 and annular receiving portion 37 falls under the condition such as within length L2<L0<L1, it is possible to change the extension and contraction length of preload spring 350 by stacking a plurality of preload springs 350 in the direction of length L2.

In this way, preload springs 35 and 350 can be appropriately changed in accordance with an installation location or a preload target to adjust the preload force for suitable high-speed rotation and stable drive of the spring while vibration in the axial direction is prevented.

Figure 11:
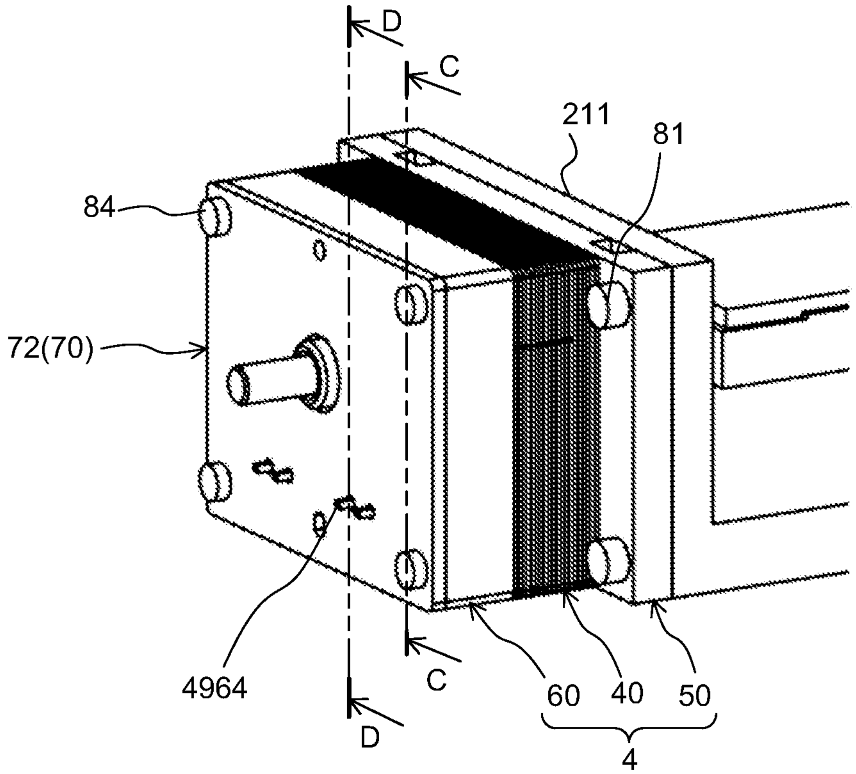
FIG. 11 is an enlarged perspective view of a front-side end portion of the rotary reciprocating drive actuator.
Figure 12:
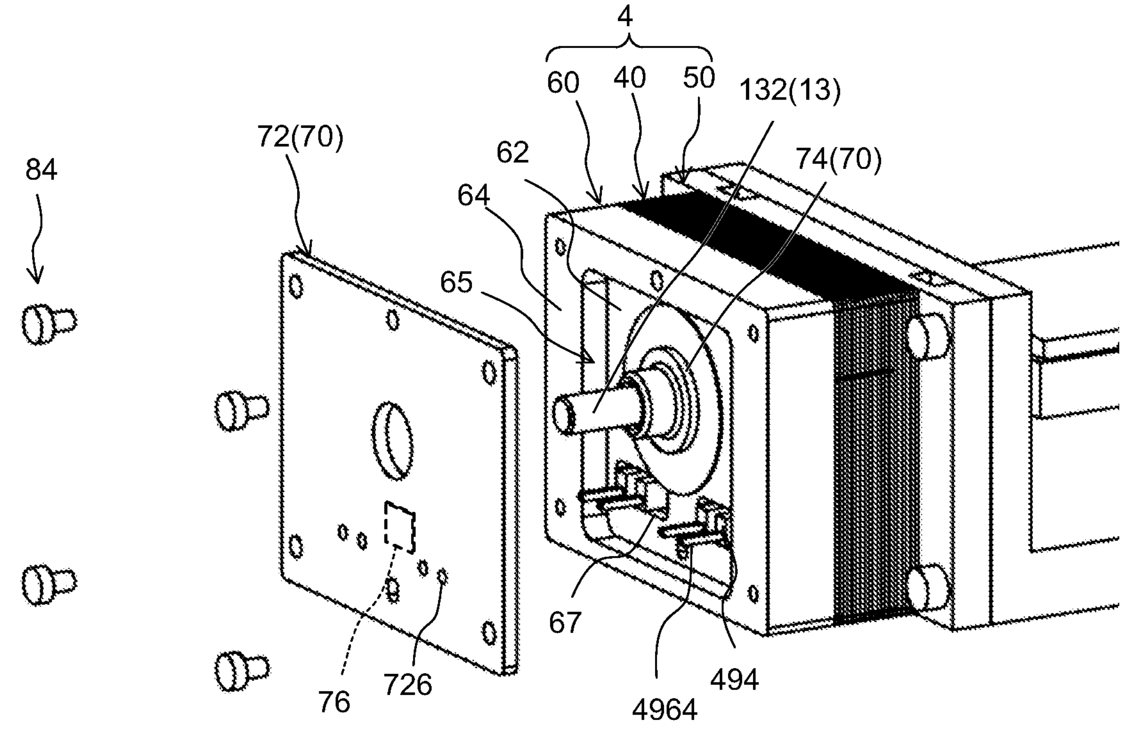
FIG. 12 is a perspective view illustrating the inside of a top cover in a state where a sensor board is removed in FIG. 11.
Figure 13:
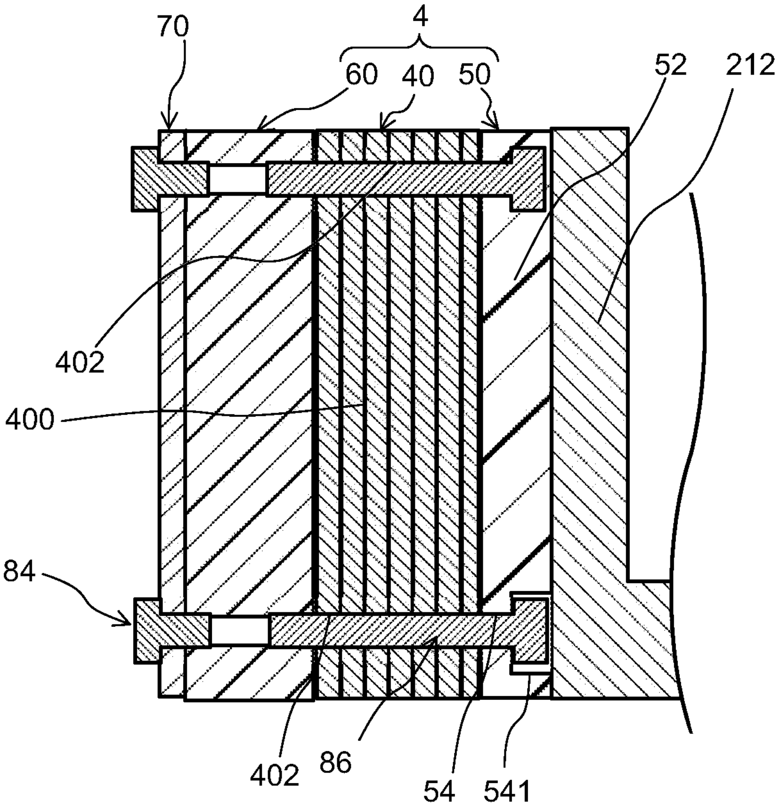
FIG. 13 is a sectional view taken along line C-C and seen in the direction indicated by the arrows in FIG. 11.
Figure 14:
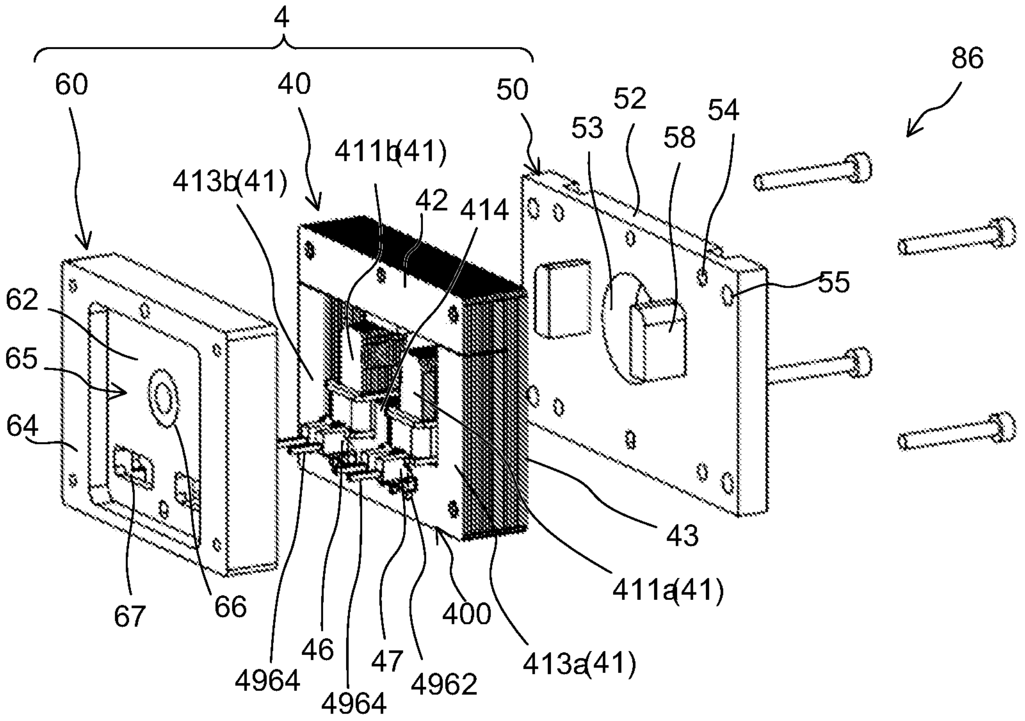
FIG. 14 is an exploded perspective view of the driving unit.

FIG. 11 is an enlarged perspective view of a front-side end portion of the rotary reciprocating drive actuator, FIG. 12 is a perspective view illustrating the inside of a top cover in a state where sensor board 72 is removed from the front-side end portion in FIG. 11, FIG. 13 is a sectional view taken along line C-C and seen in the direction indicated by the arrows in FIG. 11, and FIG. 14 is an exploded perspective view of the driving unit.

<Driving Unit 4>

Driving unit 4 illustrated in FIGS. 2 to 6 and 11 to 14 is disposed on one of the opposite end portions of base portion 21 spaced apart in the axial direction, and forms a part of fixing body 20. Driving unit 4, together with magnet 32, forms driving part 30 and moves movable body 10. Driving unit 4 includes bottom cover 50, and core assembly 40, and top cover 60. Driving unit 4 is formed in, for example, a rectangular parallelepiped shape having a square shape in front view.

<Core Assembly 40>

Core assembly 40 illustrated in FIGS. 3, 4, and 14 includes coils 44 and 45, bobbins 46 and 47 around which coils 44 and 45 are wound, core body 400, and rotational angle position holding portion 48.

In the present embodiment, core assembly 40 is formed in a block-like shape (specifically, a rectangular parallelepiped shape) of a rectangular frame shape in which magnetic poles **410*a* and 410*b* are disposed inside. Core assembly 40 is formed so as to surround, with the frame-shaped outer circumferential portion, magnetic poles 410*a* and 410*b* disposed inside the outer circumferential portion. Core assembly 40 forms a single magnetic path that extends from and turns around, for example, each of magnetic poles 410*a* and 410*b* sandwiching magnet 32 in a rectangular region of the wall surface of wall portion 211 of base portion 21 as seen in the axial direction, and that surrounds magnetic poles 410*a* and 410*b***.

<Core Body 400>

Core body 400 forms a magnetic circuit having a magnetic path disposed to surround magnet 32. Core body 400 includes first core 41 with an integrated structure including a plurality of magnetic poles **410*a* and 410*b* and C-shaped magnetic path portion (connecting side portion 412 and lateral side portions 413), second core 42 disposed to extend between lateral side portions 413 of first core 41, and frame-shaped third core 43. Core body 400** is integrated by magnetically coupling together the first to third cores.

First to third cores 41 to 43 allow a magnetic flux generated during energization of coils 44 and 45 to pass through the plurality of magnetic poles **410*a* and 410*b*. First to third cores 41 to 43 are, for example, a laminated core formed by laminating electromagnetic steel plates such as silicon steel sheets (laminated members). By forming core body 400 in a laminated structure, it is possible to configure first to third cores 41 to 43** having a complicated shape at low cost.

<First Core 41>

In first core 41, connecting side portion 412 extending perpendicularly to the extending direction of a plurality of rod-shaped bodies 411 (**411*a* and 411*b*) is connected to base end portions of the plurality of rod-shaped bodies 411 (411*a* and 411*b*) respectively having opposed magnetic poles at tip end portions. Opposite lateral side portions 413*a* and 413*b* are perpendicularly disposed to disposed from the opposite end portions of connecting side portion 412. Connecting side portion 412 is provided with complementary pole portion 414 extending between rod-shaped bodies 411*a* and 411*b* and parallel to rod-shaped bodies 411*a* and 411*b***.

Rod-shaped bodies 411(**411*a* and 411*b*), connecting side portion 412, lateral side portions 413 (413*a* and 413*b*), and complementary pole portion 414 are integrally formed, and first core 41** is comb-shaped.

In rod-shaped bodies **411*a* and 411*b*, the magnetic poles are disposed on the side surface portions of the tip end portions, respectively, and bobbins 46 and 47 are externally fitted to the base end portions of the outer circumferences of rod-shaped bodies 411*a* and 411*b*. Accordingly, coils 44 and 45 are disposed to be wound around rod-shaped bodies 411*a* and 411*b***.

When excited by energization of coils 44 and 45, the magnetic poles at the tip end portions of rod-shaped bodies **411*a* and 411*b* have polarities corresponding to the energization directions. Each of the magnetic poles is disposed to face magnet 32, and each of the magnetic poles has a shape curved along the outer circumferential surface of magnet 32. These curved shapes are, for example, disposed to face each other in a direction perpendicular to the extending direction of rod-shaped bodies 411*a* and 411*b***.

Rod-shaped bodies **411*a* and 411*b* have, for example, an external dimension to which bobbins 46 and 47 can be externally fitted from the tip end side. Thus, bobbins 46 and 47 can be externally fitted from the tip end side of rod-shaped bodies 411*a* and 411*b* in the extending direction, that is, from the tip end portions of magnetic poles 410*a* and 410*b*, and can be positioned so as to surround the rod-shaped bodies at the positions on the base end portion side of rod-shaped bodies 411*a* and 411*b*. Each of externally fitted bobbins 46 and 47 is disposed between lateral side portion 413 and complementary pole portion 414**.

Connecting side portion 412 constitutes one side portion of rectangular-shaped core body 400, is connected to the base end portions of rod-shaped bodies **411*a* and 411*b*, and is disposed to extend in a direction perpendicular to the parallel extension direction of rod-shaped bodies 411*a* and 411*b***.

Connecting side portion 412 mainly connects the base end portions of rod-shaped bodies **411*a* and 411*b* and opposite lateral side portions 413*a* and 413*b*. Opposite lateral side portions 413*a* and 413*b* are preferably in close contact with the opposite end portions of second core 42, but are disposed so that a gap is provided between opposite lateral side portions 413*a* and 413*b* and the opposite end portions of second core 42** in this embodiment.

Connecting side portion 412 and opposite lateral side portions **413*a* and 413*b* are disposed, together with second core 42, to be stacked on third core 43** in close contact with the third core in the axial direction.

Complementary pole portion 414 is disposed opposite to rotational angle position holding portion 48, and when magnet 32 attracts rotational angle position holding portion 48, the rotational angle position holding portion attracts another pole of magnet 32 to reinforce the attraction state of rotational angle position holding portion 48.

Specifically, complementary pole portion 414 is made of a magnetic material, and is disposed to, for example, together with magnetic poles 410*a* and 410*b* and rotational angle position holding portion 48, surround magnet 32 in four directions.

Complementary pole portion 414 generates a magnetic attraction force between itself and magnet 32 (specifically, with pole 32*b*), and moves pole 32*b* different from pole 32*a* attracted by rotational angle position holding portion 48 in magnet 32. The poles are moved to positions opposite to each other. By this action, complementary pole portion 414 cancels the axis-radial load acting on movable body 10 by the magnetic attraction force in rotational angle position holding portion 48. Note that "canceling the axis-radial load" also includes "configuring to cancel the axis-radial load."

Note that a complementary pole surface of complementary pole portion 414 facing the outer circumferential surface of magnet 32 is a curved surface corresponding to the shape of the outer circumferential surface of magnet 32, and has an entirely uniform gap from the outer circumferential surface of magnet 32. In addition, since complementary pole portion 414 is disposed in core assembly 40 so as to surround magnet 32 together with rotational angle position holding portion 48. Accordingly, a minimum space layout is achieved. Thus, it is possible to realize rotary reciprocating drive actuator 1 which is more miniaturized.

<Second Core 42>

Second core 42, together with first core 41, forms the magnetic path disposed to surround the magnetic poles of the tip end portions of rod-shaped bodies 411*a* and 411*b* from four sides. Second core 42 is formed in a prismatic shape, and forms the magnetic path through which magnetic flux passes through magnetic poles 410*a* and 410*b* when coils 44 and 45 are energized.

Second core 42 has the same thickness (axial length) as opposite lateral side portions 413*a* and 413*b*.

Second core 42 is fixed to bottom cover 50 and top cover 60 while being in close contact with third core 43 via fastening members 86 inserted into attachment holes (fastening holes) 402 similar to attachment holes (fastening holes) 402 disposed in the opposite end portions of the connecting side portion of first core 41 (see FIG. 13). Attachment holes 402 have the same diameter as through-holes 54 in bottom cover 50 and are formed so as to extend in parallel with rotation shaft 13.

Rotational angle position holding portion 48 is attached to second core 42 at a central portion in the extending direction and at a portion facing magnet 32.

<Third Core 43>

Together with connecting side portion 412, and opposite lateral side portions 413 of first core 41, and second core 42, third core 43 forms the magnetic path that surrounds the plurality of magnetic poles and connects the plurality of magnetic poles.

Third core 43 has a rectangular frame plate shape, and is attached in surface contact with the rectangular frame-shaped portion formed by both of first core 41 and second core 42.

Specifically, third core 43 faces and makes surface contact with connecting side portion 412 and opposite lateral side portions 413*a* and 413*b* of first core 41 in the extending direction of rotation shaft 13. In addition, third core 43 is assembled to first core 41 in a state where the plurality of magnetic poles on rod-shaped bodies 411*a* and 411*b* of first core 41 are positioned around rotation shaft 13. In addition, third core 43 faces and makes surface contact with second core 42 in the extending direction of rotation shaft 13.

Thus, third core 43 is disposed around rotation shaft 13 so as to surround the magnetic poles and coils 44 and 45 of rod-shaped bodies 411*a* and 411*b*, and forms a seamless magnetic path around rotation shaft 13. First to third cores 41 to 43 have a surrounding portion surrounding coils 44 and 45, and can form a flow of magnetic flux passing from one magnetic pole to the other magnetic pole of first core 41+third core 43, third core 43, third core 43+second core 42, and third core 43+first core 41 in this order. Further, since first to third cores 41 to 43 annularly surround the magnetic poles and magnet 32 between the magnetic poles, it is possible to prevent contact with coils 44 and 45 from the outside.

After driving unit 4 is assembled, rotation shaft 13 is inserted into a space surrounded by the magnetic poles. Further, magnet 32 attached to rotation shaft 13 is located in this space, and the magnetic poles face magnet 32 via air gap G at an accurate position.

Magnet 32 is a ring-type magnet in which S pole 32*a* and N pole 32*b* are alternately disposed in the circumferential direction. Magnet 32 is attached to the circumferential surface of rotation shaft 13 so as to be located in the space surrounded by magnetic poles 410*a* and 410*b* of core body 400 after rotary reciprocating drive actuator 1 is assembled. Magnet 32 is fixed so as to surround the outer circumference of rotation shaft 13. When coils 44 and 45 are energized, first core 41, second core 42, and third core 43 including rod-shaped bodies 411*a* and 411*b* are energized, and magnetic poles 410*a* and 410*b* have the polarities corresponding to the energization directions. As a result, magnetic forces (attractive force and repulsive force) are generated between magnetic poles 410*a* and 410*b* and magnet 32.

In the present embodiment, magnet 32 is magnetized to different polarities changed at a plane along the axial direction of rotation shaft 13 serving as a boundary. That is, magnet 32 is a two-pole magnet magnetized so as to be equally divided into S pole 32*a* and N pole 32*b*. The number of magnetic poles of magnet 32 (two in the present embodiment) is equal to the number of magnetic poles 410*a* and 410*b* of core body 400. Note that magnet 32 may be magnetized to have two or more poles depending on the amplitude at the time of movement. In this case, magnetic pole portions of core body 400 are disposed correspondingly to the magnetic poles of magnet 32.

<Magnet 32>

The polarities of magnet 32 are switched at boundary portions 32*c* and 32*d* between S pole 32*a* and N pole 32*b* (hereinafter referred to as "magnetic pole switching portions"). Magnetic pole switching portions 32*c* and 32*d* are formed in a groove-like shape extending through the axial center in one end face of magnet 32. Magnetic pole switching portions 32*c* and 32*d* respectively face magnetic poles 410*a* and 410*b* when magnet 32 is held in a neutral position.

When magnetic pole switching portions 32*c* and 32*d* are formed in a groove shape, the positional relation between the components fixed to rotation shaft 13 can be adjusted with respect to the groove at the time of assembly or maintenance of rotary reciprocating drive actuator 1. In particular, the position of mirror part 12, the attachment position of an encoder of angle sensor part 70, and the like can be appropriately and accurately defined with respect to rotation shaft 13 in accordance with the positions of magnetic pole switching portions 32*c* and 32*d* of magnet 32. For example, a jig is brought into contact with the groove in the axial direction, and a projection is fitted to the groove to restrict the rotation of rotation shaft 13 around the axis to make the jig immovable. Accordingly, a reference position for other components to be attached to rotation shaft 13 is obtained. In particular, accuracy is required to adjust the angle of magnet 32 of the mirror with respect to the poles, and this accuracy is made possible.

In the neutral position, magnetic pole switching portions 32*c* and 32*d* of magnet 32 face magnetic poles 410*a* and 410*b*, and thus, driving unit 4 can generate the maximum torque and stably drive movable body 10.

Further, by configuring magnet 32 with a two-pole magnet, the magnet cooperates with core body 400 to easily drive a movable object at a high amplitude, to improve the driving performance. That is, mirror part 12, which is the movable target, can be driven at a wide angle. Note that although the embodiment has been described in connection with the case where magnet 32 has a pair of magnetic pole switching portions 32*c* and 32*d*, two or more pairs of magnetic pole switching portions may be included.

<Coil Body (Coil and Bobbin)>

Coils 44 and 45 are wound around cylindrical bobbins 46 and 47. Coil bodies composed of coils 44 and 45 and bobbins 46 and 47 are externally fitted to rod-shaped bodies 411*a* and 411*b* of first core 41. Thus, coils 44 and 45 are disposed to be wound around rod-shaped bodies 411*a* and 411*b*. Thus, coils 44 and 45 are disposed adjacently to the magnetic poles of the tip end portions of rod-shaped bodies 411*a* and 411*b*.

The winding directions of coils 44 and 45 are set such that magnetic flux is appropriately generated from one of the plurality of magnetic poles of first core 41 toward the other when energization is performed.

Figure 15:
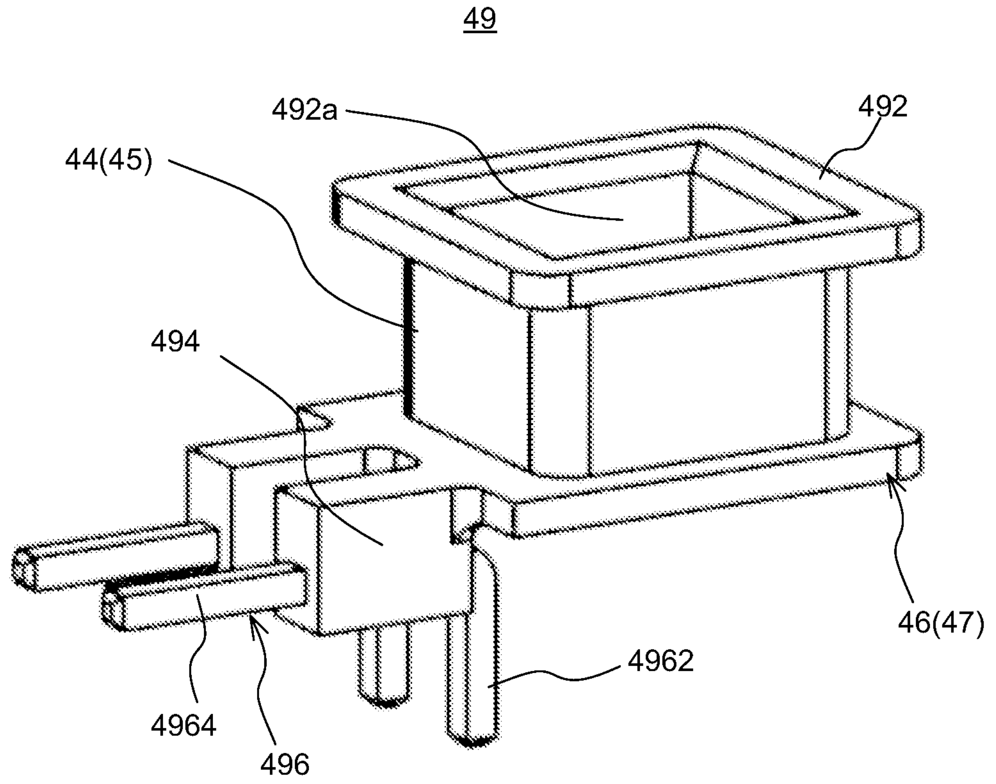
FIG. 15 is a perspective view of a coil body.
Figure 16:
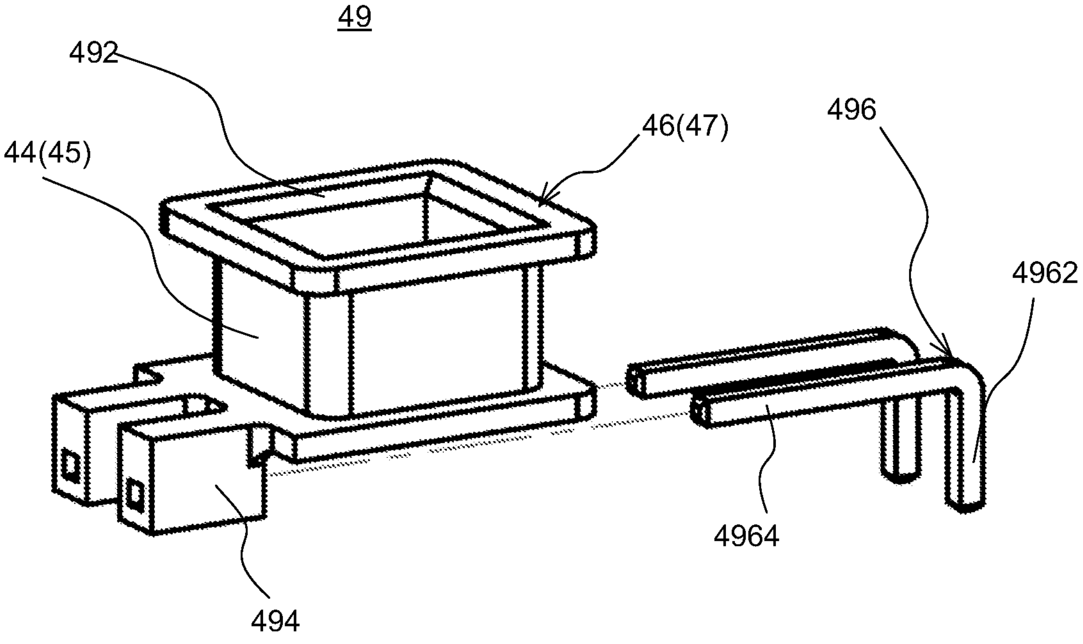
FIG. 16 is an exploded view of a bobbin.
Figure 17:
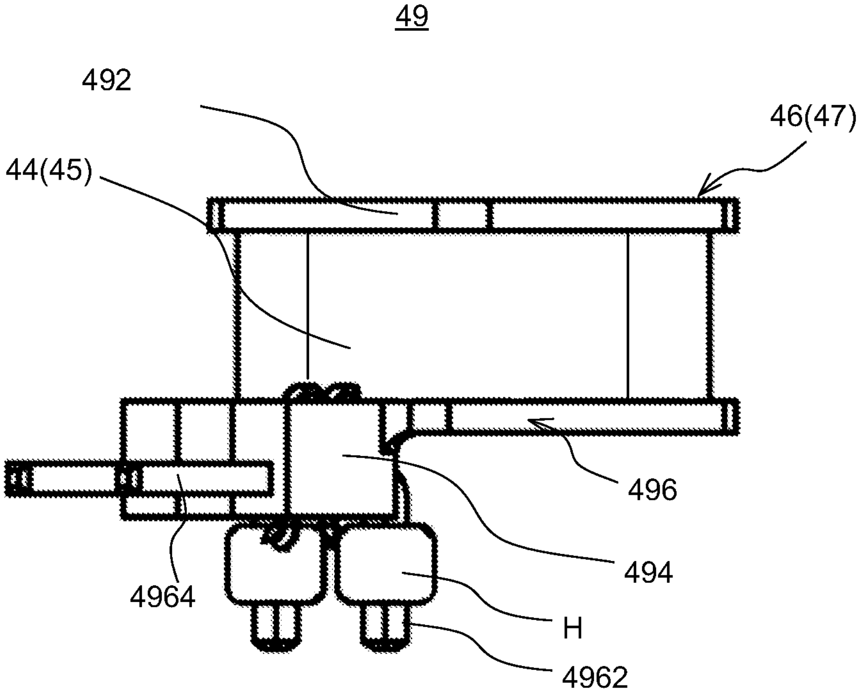
FIG. 17 is a perspective view illustrating a connection state of a coil in the coil body.

FIG. 15 is a perspective view of the coil body, FIG. 16 is an exploded view of the bobbin, and FIG. 17 is a perspective view illustrating a connection state of the coil in the coil body.

Since the configuration of the coil body being bobbin 46 around which coil 44 is wound and the configuration of the coil body having bobbin 47 around which coil 45 is wound are the same, a description will be given of the coil body having bobbin 46 around which coil 44 is wound, and the description of the coil body having coil 45 and bobbin 47 will be omitted.

Coil body 49 includes bobbin portion 492 around which coil 44 is wound, and terminal support portions 494 that support terminals 496 and is integrally disposed with bobbin portion 492.

Bobbin portion 492 includes a through-hole through which rod-shaped body 411 (411*a* or 411*b*) is inserted, and terminal support portions 494 are disposed to protrude from a flange of an opening edge portion on one side of bobbin portion 492.

Terminal support portions 494 have a rectangular cylindrical shape, and terminals 496 are inserted therein. The terminal support portions hold terminals 496.

Terminals 496 have an L-shape. The end portions of coil 44 are tied to be connected with one side portions 4962. The base end portions of other side portions 4964 are inserted into and supported by terminal support portions 494. The tip end portion side of other side portions 4964 protrudes to the outside from terminal support portions 494.

The tip end portion side of each of other side portions 4964 is connected to an external device that supplies power to coil 44, or is connected to an end portion of an adjacent coil. In the present embodiment, in each of terminals 496, the extending direction of one side portion 4962 is parallel to the axial direction of coil 44, and the extending direction of other side portion 4964 is perpendicular to the axial direction of coil 44.

In coil body 49, one side portions 4962 of terminals 496 are disposed to extend in the opening direction of the opening portion of bobbin portion 492, and other side portions 4964 are disposed to extend in the protruding direction of the flange of bobbin portion 492.

In one side portions 4962, coil wires of the opposite ends of coil 44 are connected respectively to connection portions H made of solder or the like.

As described above, terminals 496 have an L-shape, and coil windings are connected to one side portions 4962 that are one side portions (connection portions H that are a fillet), and are joined to sensor board 72 at other side portions 4964.

Since each of terminals 496 is L-shaped, connection of the sensor board connection side and connection of the coil connection side can be made separately. In particular, a work for forming connection portions (fillets) H for connecting the coil windings by solder can be easily performed without interference of the solder and the winding.

That is, even when a connection work for connecting sensor board 72 and a work for fixing the windings of same terminals 494 occur, a hindrance factor in a connection process for connection with the board, such as solder adherence during insertion of the windings is not caused. Since sensor board 72 is disposed in the axial direction with respect to driving unit 4 in the connection between sensor board 72 and terminals 496, it is possible to take a contamination countermeasure while performing positioning, and to easily dispose an optical sensor to the axial direction.

<Rotational Angle Position Holding Portion (Magnet Position Holding Portion) 48>

Rotational angle position holding portion 48 illustrated in FIGS. 2 to 4 is incorporated in core assembly 40 so as to face magnet 32 via air gap Gin a state in which rotary reciprocating drive actuator 1 is assembled. For example, rotational angle position holding portion 48 is attached to second core 42 in an attitude in which the magnetic pole faces magnet 32.

Rotational angle position holding portion 48 uses, for example, a magnet having a magnetic pole directed toward magnet 32 to generate a magnetic attraction force between the magnet and magnet 32, and attracts magnet 32. That is, rotational angle position holding portion 48, together with rod-shaped bodies 411*a* and 411*b*, forms a magnetic spring between the rotational angle position holding portion and magnet 32. The magnetic spring maintains the rotational angle position of magnet 32, that is, the rotational angle position of rotation shaft 13 at the neutral position in a normal state (in a non-energized state) in which coils 44 and 45 are not energized.

At this time, magnetic pole 32*b* (the N pole illustrated in FIG. 3) of magnet 32 attracting rotational angle position holding portion 48, which is opposed to magnetic pole 32*a* (the S pole in FIG. 3), attracts complementary pole portion 414 of first core 41, which is a magnetic material in close proximity. Thus, magnet 32, that is, mirror part 12, which is the movable object, is more effectively held at the neutral position.

The neutral position is a reference position of the reciprocating rotation operation of magnet 32, that is, a center position of the reciprocating rotation (swing), and is a position at which the same rotational angle is achieved during right and left reciprocating rotation around the axis. When magnet 32 is held in the neutral position, boundary portions 32*c* and 32*d* of magnet 32 face the magnetic poles of rod-shaped bodies 411*a* and 411*b*.

Further, the attachment attitude of mirror part 12 is adjusted with reference to the state in which magnet 32 is in the neutral position. Note that, rotational angle position holding portion 48 may be formed of a magnetic material that generates a magnetic attraction force between the rotational angle position holding portion and magnet 32.

<Bottom Cover 50 and Top Cover 60>

Bottom cover 50 and top cover 60 illustrated in FIGS. 1, 2, 4 to 6, and 11 to 14 are preferably made of an electrically conductive material having a non-magnetic property and having high electric conductivity, and function as an electromagnetic shield.

Bottom cover 50 and top cover 60 are disposed on opposite sides of core assembly 40 in the axial direction (thickness direction).

Bottom cover 50 and top cover 60 can suppress the incidence of noise to core assembly 40 and the emission of noise from core body 400 to the outside.

Bottom cover 50 and top cover 60 are made of, for example, a non-magnetic material such as an aluminum alloy, having electrical conductivity and high thermal conductivity. The aluminum alloy has a high degree of freedom in design, and can easily impart desired rigidity to bottom. Therefore, when bottom cover 50 and top cover 60 are made of an aluminum alloy, top cover 60 suitably functions as a support for supporting rotation shaft 13.

Figure 18:
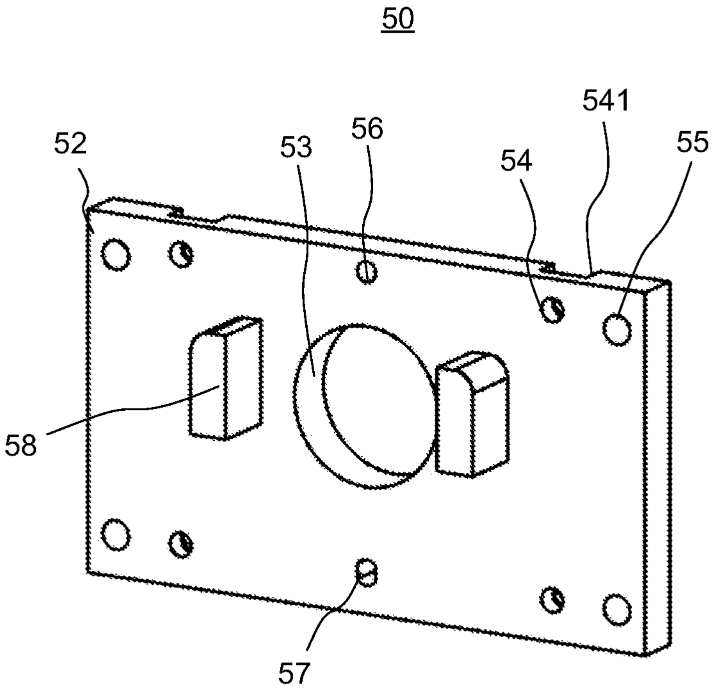
FIG. 18 is a front perspective view of a bottom cover.
Figure 19:
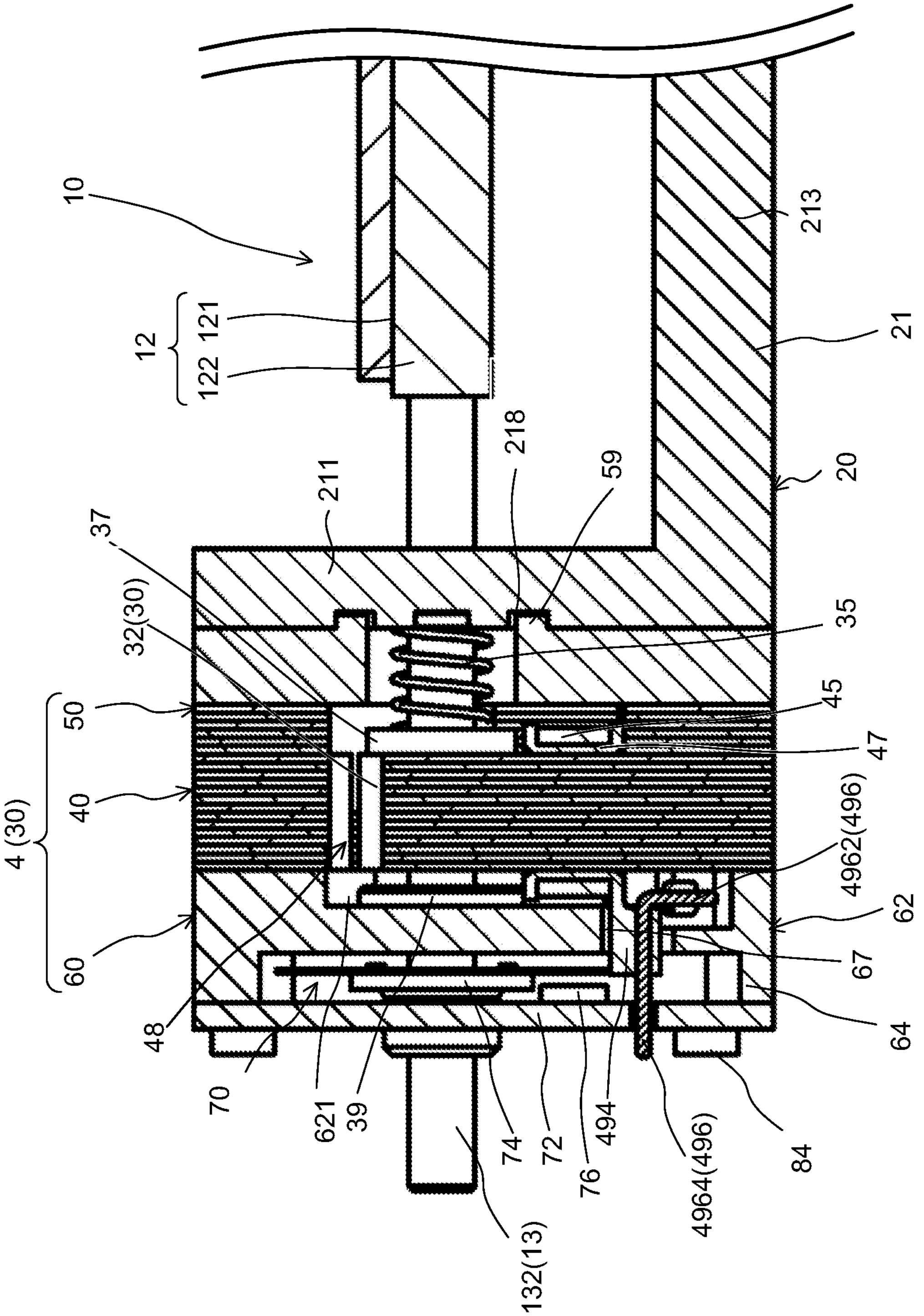
FIG. 19 is a sectional view taken along line D-D and seen in the direction indicated by the arrows in FIG. 11.

FIG. 18 is a front perspective view of the bottom cover. FIG. 19 is a sectional view taken along line D-D and seen in the direction indicated by the arrows in FIG. 11.

Bottom cover 50 is attached so as to overlap the outer surface of wall portion 211. Bottom cover 50 is formed in a rectangular plate shape corresponding to the outer shape of wall portion 211. Bottom cover 50 has rectangular plate-shaped cover main body 52, and opening portion 53 through which rotation shaft 13 is inserted is formed in a central portion of cover main body 52. Opening portion 53 is disposed at a position facing bearing 22, and an inner diameter of opening portion 53 is larger than an outer diameter of magnet 32. In bottom cover 50, rotation shaft 13 on which magnet 32 is mounted is inserted into opening portion 53, and magnet 32 can be disposed in core assembly 40 by insertion.

Preload spring 35 in which rotation shaft 13 is inserted and which is externally fitted to rotation shaft 13 is disposed in opening portion 53 (see FIG. 2).

Cover main body 52 of bottom cover 50 is provided with through-holes 54, through-holes 55 for fixation to base portion 21, positioning hole 56, position adjustment hole 57, and core holding projections 58. Fastening members 86 for integrating bottom cover 50, core assembly 40, and top cover 60 into driving unit 4 are inserted into through-holes 54. Through-holes 55 are formed in attachment portions 522 attached to wall portion 211. Note that attachment portions 522 form left and right side portions of cover main body 52 that are apart from each other in a direction orthogonal to the axial direction, and include four corner portions of cover main body 52. Through-holes 55 are formed respectively in the corners.

Opening portion 53, through-holes 54 and 55, positioning hole 56, and position adjustment hole 57 are formed parallel to the axial direction of rotation shaft 13. Fastening members 81 and 86 can be inserted through through-holes 54 and 55 for assembly to base portion 21 or for assembly of driving unit 4, and thus for assembly of rotary reciprocating drive actuator 1 in one axial direction.

As illustrated in FIG. 13, in each of through-holes 54, recessed spot-facing portion 541 is formed in the rear surface of cover main body 52, and spot-facing portion 541 accommodates the head portion of fastening member 86 such as a screw.

Core holding projections 58 are disposed to protrude in the axial direction at positions sandwiching opening portion 53 in cover main body 52, and are fitted to and position core assembly 40 when combined with core assembly 40.

Core holding projections 58 are inserted between rod-shaped bodies 411*a* and 411*b* and lateral side portions 413*a* and 413*b* to prevent leakage of magnetic flux flowing therebetween.

As illustrated in FIG. 6, positioning projection 59 is disposed to protrude from the rear surface of bottom cover 50. When bottom cover 50 is brought into contact with base portion 21 in a state where the centers thereof coincide with each other, positioning projection 59 is engaged with recessed portion 218 of wall portion 211 for positioning.

Positioning projection 59 is, for example, an annular projection. On the other hand, as illustrated in FIGS. 5, 7, and 8, recessed portion 218 of wall portion 211 is an annular groove formed so as to surround insertion hole 211*a* in base portion 21. Positioning projection 59 is engaged with recessed portion 218 being the annular groove, and both wall portion 212 and driving unit 4 are positioned.

Top cover 60 and bottom cover 50 sandwich core assembly 40 from opposite sides in the axial direction, and the top cover is integrally fixed by fastening members 86 to form driving unit 4. As illustrated in FIGS. 2, 4, and 12, top cover 60 of the present embodiment functions as a sensor housing that houses movable body 10, that is, optical sensor 76 that detects the rotational angle of rotation shaft 13.

Top cover 60 includes top cover main body 62 that covers the surface of core assembly 40 on the front end side, and sensor circumferential wall portion (circumferential wall portion) 64 that protrudes from the outer circumferential edge portion of top cover main body 62 toward the other end portion 132 side in the axial direction and forms recessed sensor housing 65.

Top cover main body 62 as seen in the axial direction is a plate-shaped body having a square shape and having depressed portion 621 that opens toward the core assembly 40 side. Top cover main body 62 is a square plate-like body, and circumferential wall portion 64 is formed in a rectangular frame shape that extends upright from the outer circumferential portion of top cover main body 62.

Through-hole 66 is disposed in top cover main body 62 of top cover 60. Through-hole 66 is disposed in top cover main body 62 so as to have the same axis as opening portion 53 in bottom cover 50 and bearings 22 and 23 of base portion 21. Bushing 39 through which rotation shaft 13 is inserted is internally fitted to through-hole 66 from the back surface side (one end portion 131 side). Thus, bushing 39 is attached to top cover main body 62 in a state in which the movement direction is restricted. Note that bushing 39 and rotation shaft 13 may be disposed to slide with each other, or may be disposed to have a gap therebetween.

Bushing 39 prevents an impact from being transmitted to a sensor component (encoder disk) on the other end portion 132 side when rotation shaft 13 receives the impact. Bushing 39 is attached to top cover 60 such that the other end portion of the bushing is internally fitted to through-hole 66 and one end portion thereof is located in depressed portion 621.

In addition to through-hole 66, bobbin engaging holes 67 that are engaged with bobbins 46 and 47 are disposed in top cover main body 62 to extend through top cover main body 62 in the axial direction.

Terminal support portions 494 of coil body 49 having bobbins 46 and 47 are internally fitted to bobbin engaging holes 67. As a result, terminal support portions 494 are inserted into top cover main body 62, and other side portions 4964 are disposed to protrude from terminal support portion 494.

The engagement between bobbin engaging holes 67 and terminal support portions 494 also functions as positioning during assembly of core assembly 40 and top cover 60.

<Angle Sensor Part 70>

Angle sensor part 70 is attached to top cover 60. Angle sensor part 70 detects a rotational angle of movable body 10 including magnet 32 and rotation shaft 13. Rotary reciprocating drive actuator 1 can control the rotational angle position and the rotation speed of the movable body, specifically, of mirror part 12, which is a movable object, at the time of driving via a control part based on the detection result of angle sensor part 70.

Angle sensor part 70 may be a sensor of any type such as a magnetic type or an optical type. In the present embodiment, angle sensor part 70 includes sensor board 72, encoder disk 74 accommodated in sensor housing 65 and being a component of angle sensor part 70, and optical sensor 76 (sensor) having a light source, a light receiving element, and the like.

Angle sensor part 70 detects the rotational angle of rotation shaft 13 and thus of mirror part 12. Encoder disk 74 is fixed to the other end portion 132 side of rotation shaft 13 in sensor housing 65, and rotates integrally with magnet 32 and mirror part 12. That is, the rotational position of encoder disk 74 is the same as the rotational position of rotation shaft 13.

Optical sensor 76 emits light to encoder disk 74 and detects the rotational position (angle) of the encoder disk based on the reflected light. Thus, the rotational positions of magnet 32 and mirror part 12 can be detected.

Optical sensor 76 is mounted on sensor board 72, and sensor board 72 is disposed to close circumferential wall portion 64, and closes sensor housing 65.

Sensor board 72 is a board on which optical sensor 76 that detects the rotational angle of rotation shaft 13 is mounted. Sensor board 72 is disposed to cover core assembly 40 from the other end portion 132 side, with optical sensor 76 facing magnet 32 side.

Sensor board 72 is centrally disposed, and includes fastening holes 722 and through-holes 726 in addition to an attachment portion (encoder hub) to which the encoder disk is attached and opening portion 724 into which rotation shaft 13 is inserted.

Sensor board 72 is fastened to top cover 60 via fastening members 84.

Fastening holes formed in top cover 60 are formed on the extension of fastening holes 402 of core assembly 40 and have the same coaxial diameter as the fastening holes. That is, sensor board 72 is fixed to the core assembly 40 side via fastening members 84 to the fixing holes of the same diameter continuous to attachment holes (fastening holes) 402 in core assembly 40.

As described above, sensor board 72, top cover 60, core assembly 40 (core body 400), and bottom cover 50 are fixed by the fastening members via the holes having the same diameter as and being axially continuous to one another, such as the fastening holes, attachment holes 402, and through-holes 54.

Sensor board 72 is provided with a circuit for detecting the rotational position (angle) of the encoder disk and a circuit for supplying power to coils 44 and 45.

The circuit for supplying power includes a circuit for connecting one end portions of coils 44 and 45 to each other, and this circuit includes through-holes 726 in which other side portions 4964 of terminal support portions 494 disposed on the bobbins having coils 44 and 45 are inserted and connected to the circuit.

When other side portions 4964 are inserted into through-holes 726, coils 44 and 45 are connected at one end portions to each other via sensor board 72, and an input/output circuitry for power supply is connected to the other end portions.

Thus, only by assembling driving unit 4, and attaching sensor board 72 to top cover 60, it is possible to configure the circuit for supplying power to coils 44 and 45, and to prevent intrusion of unnecessary substances such as foreign matter from the outside into a sensing portion of angle sensor part 70.

In addition, since other side portions 4964 of terminal support portions 494 in the coil body are directly connected to sensor board 72, the sensor portion and the terminals for driving the actuator (motor portion) can be integrated on sensor board 72, which is a single board, for interconnection. That is, in addition to the circuit for the sensor, the circuit for driving the actuator can be mounted on the board used in rotary reciprocating drive actuator 1. The board can be shared. Connectors for connection of the actuator itself to an external device can be unified.

Figure 20:
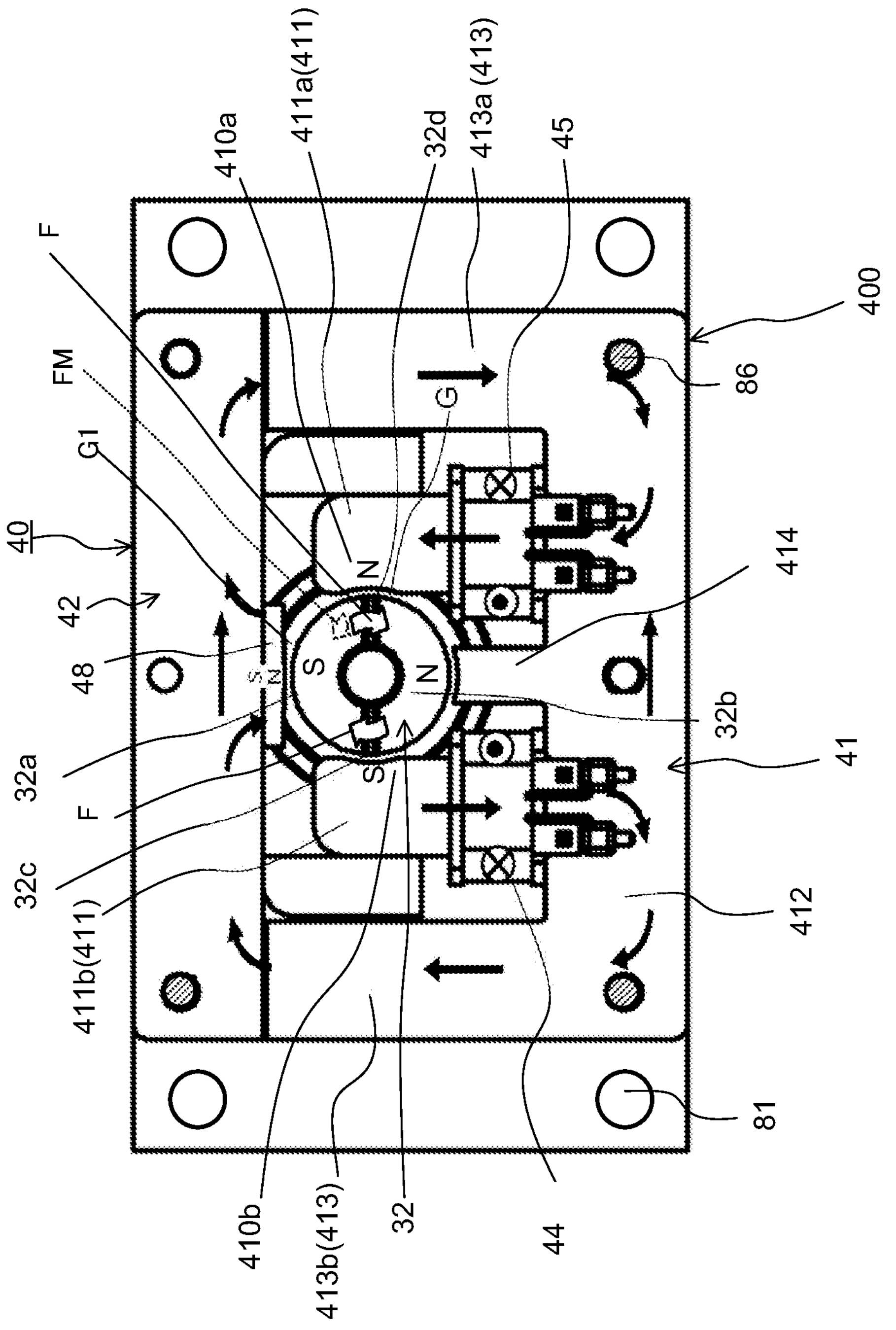
FIG. 20 is a view for explaining the operation of the magnetic circuit of the rotary reciprocating drive actuator.

Next, the operation of rotary reciprocating drive actuator 1 will be described with reference to FIGS. 3 and 20. FIG. 20 is a diagram for explaining the operation of the magnetic circuit of rotary reciprocating drive actuator 1.

Magnetic poles 410*a* and 410*b* of two rod-shaped bodies 411*a* and 411*b* of core body 400 of core assembly 40 are disposed to sandwich magnet 32 with air gap G therebetween. When coils 44 and 45 are not energized, as illustrated in FIG. 3, magnet 32 is held in the neutral position by the magnetic attraction force between the magnet and rotational angle position holding portion 48.

In this neutral position, one of S pole 32*a* and N pole 32*b* of magnet 32 (S pole 32*a* in FIG. 20) is attracted to rotational angle position holding portion 48 (see magnetic spring torque FM in FIG. 20). At this time, magnetic pole switching portions 32*c* and 32*d* face the center positions of magnetic poles 410*a* and 410*b* of core body 400. Further, complementary pole portion 414 is attracted to the other of S pole 32*a* and N pole 32*b* of magnet 32 (N pole 32*b* in FIG. 20). As a result, magnet 32 moves to the neutral position more effectively.

When coils 44 and 45 are energized, core body 400 is energized, and magnetic poles 410*a* and 410*b* have polarities corresponding to the energization directions. For example, when coils 44 and 45 are energized as illustrated in FIG. 20, a magnetic flux is generated inside core body 400, and magnetic pole 410*a* becomes the N pole and magnetic pole 410*b* becomes the S pole.

Thus, magnetic pole 410*a* magnetized to the N pole attracts S pole 32*a* of magnet 32, and magnetic pole 410*b* magnetized to the S pole attracts N pole 32*b* of magnet 32.

Then, torque in direction F is generated in magnet 32 around the axis of rotation shaft 13, and magnet 32 rotates in direction F. Along with this, rotation shaft 13 also rotates in direction F, and mirror part 12 fixed to rotation shaft 13 also rotates in direction F.

Next, when coils 44 and 45 are energized in the opposite direction, the flow of the magnetic flux generated inside core body 400 is opposite to the direction illustrated in FIG. 20, and magnetic pole 410*a* becomes the S pole and magnetic pole 410*b* becomes the N pole. Magnetic pole 410*a* magnetized to the S pole attracts N pole 32*b* of magnet 32, and magnetic pole 410*b* magnetized to the N pole attracts S pole 32*a* of magnet 32. Then, torque −F in the direction opposite to direction F is generated in magnet 32 around the axis of rotation shaft 13, and magnet 32 rotates in direction −F. Along with this, rotation shaft 13 also rotates, and mirror part 12 fixed to rotation shaft 13 also rotates in the direction opposite to the direction illustrated in FIG. 20.

Rotary reciprocating drive actuator 1 causes reciprocating rotation of mirror part 12 by repeating the above-described operations.

Figure 32:
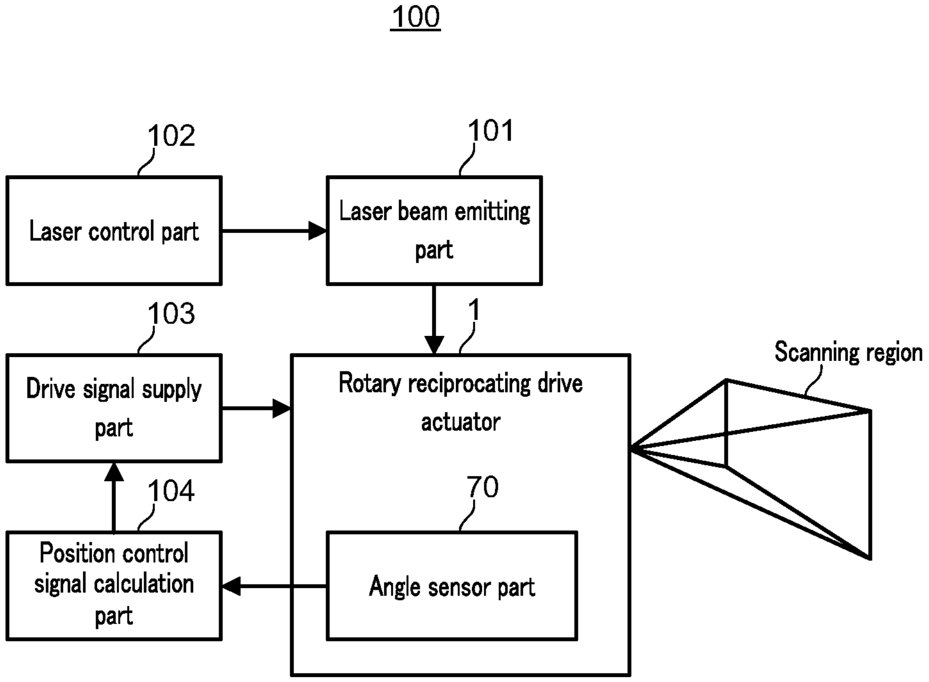
FIG. 32 is a diagram illustrating a configuration of a main part of a scanner system using the rotary reciprocating drive actuator.

In practice, rotary reciprocating drive actuator 1 is driven by an AC wave input to coils 44 and 45 from a power supply part (for example, corresponding to the drive signal supply part 103 in FIG. 32). That is, the energization direction of coils 44 and 45 is periodically switched. When the energization direction is switched, magnet 32 is biased to return to the neutral position by the magnetic attraction force between rotational angle position holding portion 48 and magnet 32, that is, the restoring force of the magnetic spring ("−FM" which is the torque in the direction opposite to magnetic spring torque FM illustrated in FIG. 20). As a result, the torque in direction F and the torque in the direction opposite to direction F (direction −F) alternately act on movable body 10. Thus, movable body 10 is rotationally reciprocally driven.

The driving principle of rotary reciprocating drive actuator 1 will be briefly described below. In rotary reciprocating drive actuator 1 of the present embodiment, when the inertial moment of the movable body (movable body 10) is J [kg·m$^2$] and the spring constant in the torsional direction of the magnetic spring (magnetic poles 410*a* and 410*b*, rotational angle position holding portion 48, and magnet 32) is $K_{sp}$ [N·m/rad], the movable body vibrates (performs reciprocating rotation) with respect to the fixing body (fixing body 20) at resonant frequency $F_r$[Hz] calculated as given by Expression 1.

[1]

$$Fr = \frac{1}{2\pi}\sqrt{\frac{K_{sp}}{J}} \qquad \text{(Expression 1)}$$

Fr: Resonant frequency [Hz]
J: Inertial moment [kg·m$^2$]
$K_{sp}$: Spring constant [N·m/rad]

Since the movable body is a mass in a vibration model of a spring-mass system, the movable body is brought into a resonance state when the AC wave of a frequency equal to resonant frequency Fr of the movable body is input to coils 44 and 45. That is, the movable body can be efficiently vibrated by inputting the AC wave of a frequency being substantially equal to resonant frequency Fr of the movable body to coils 44 and 45 from the power supply part.

The equation of motion and the circuit equation representing the driving principle of rotary reciprocating drive actuator 1 are illustrated below. Rotary reciprocating drive actuator 1 is driven based on the equation of motion represented by Expression 2 and the circuit equation represented by Expression 3.

[2]

$$J\frac{d^2\theta(t)}{dt^2} = K_t i(t) - K_{sp}\theta(t) - D\frac{d\theta(t)}{dt} - T_{Loss} \qquad \text{(Expression 2)}$$

J: Inertial moment [kg·m$^2$]
θ(t): Angle [rad]
$K_t$ Torque constant [N·m/A]
i(t): Current [A]
$K_{sp}$: Spring constant [N·m/rad]
D: Damping coefficient [N·m/(rad/s)]
$T_{Loss}$: Loading torque [N·m]

[3]

$$e(t) = Ri(t) + L\frac{di(t)}{dt} + K_e\frac{d\theta(t)}{dt} \qquad \text{(Expression 3)}$$

e(t): Voltage [V]
R: Resistance [Ω]
L: Inductance [H]
$K_e$: Counter electromotive force constant [V/(rad/s)]

That is, inertial moment J [kg·m$^2$], rotational angle θ(t) [rad], torque constant $K_t$ [N·m/A], current i(t) [A], spring constant $K_{sp}$ [N·m/rad], damping coefficient D [N·m/(rad/s)], loading torque $T_{Loss}$ [N·m], and the like of the movable body in rotary reciprocating drive actuator 1 may be changed appropriately as long as Expression 2 is satisfied. In addition, voltage e(t) [V], resistance R [Ω], inductance L [H], and reverse electromotive force constant $K_e$ [V/(rad/s)] may be changed appropriately as long as Expression 3 is satisfied.

As is understood, rotary reciprocating drive actuator 1 can efficiently obtain large vibrational outputs when the coils are energized by an AC wave corresponding to resonant frequency Fr determined by inertial moment J of the movable body and spring constant K s p of the magnetic spring.

<Variation 1>

Figure 21:
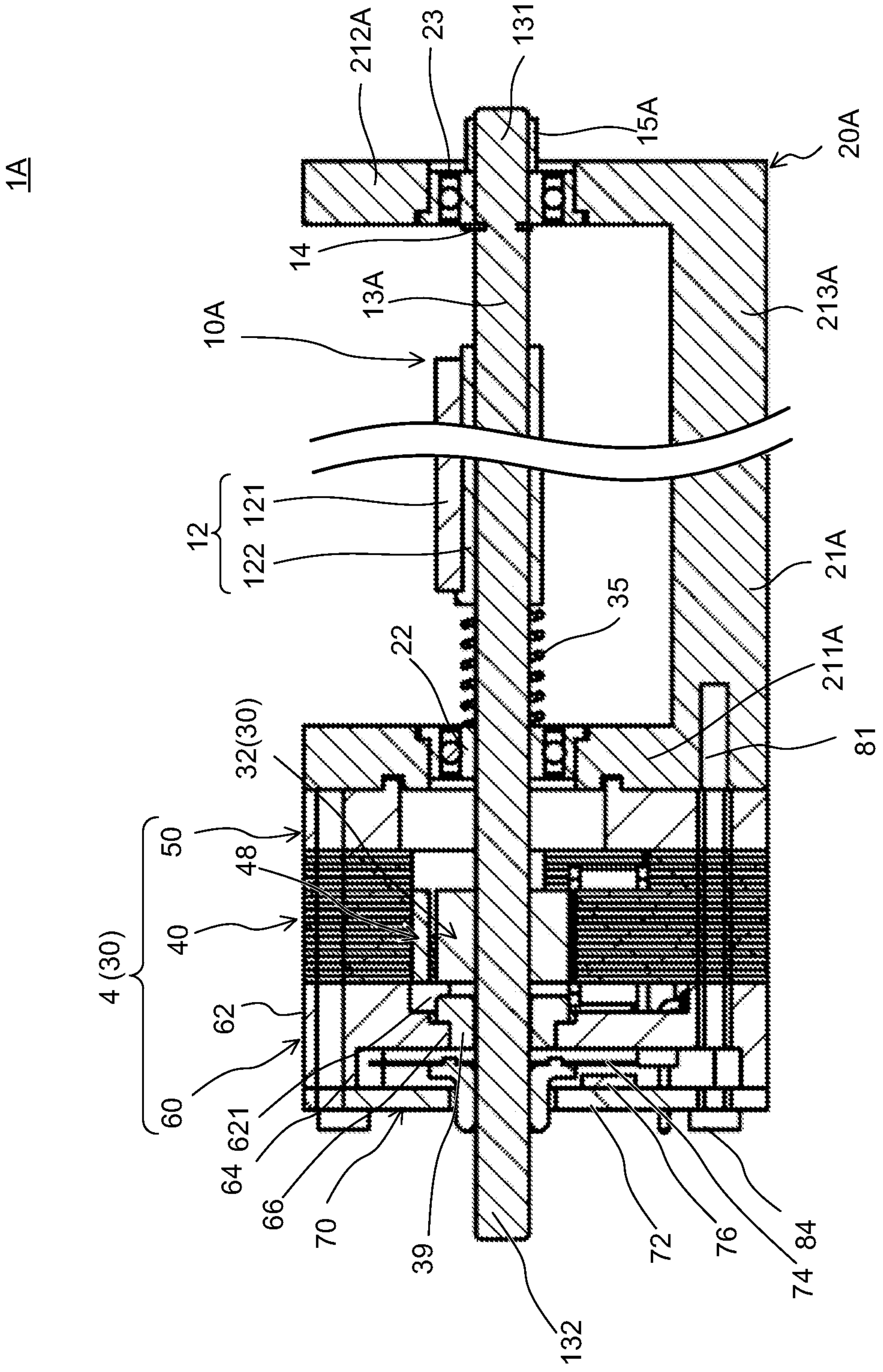
FIG. 21 is a longitudinal sectional view illustrating Variation 1 of the rotary reciprocating drive actuator.
Figure 22:
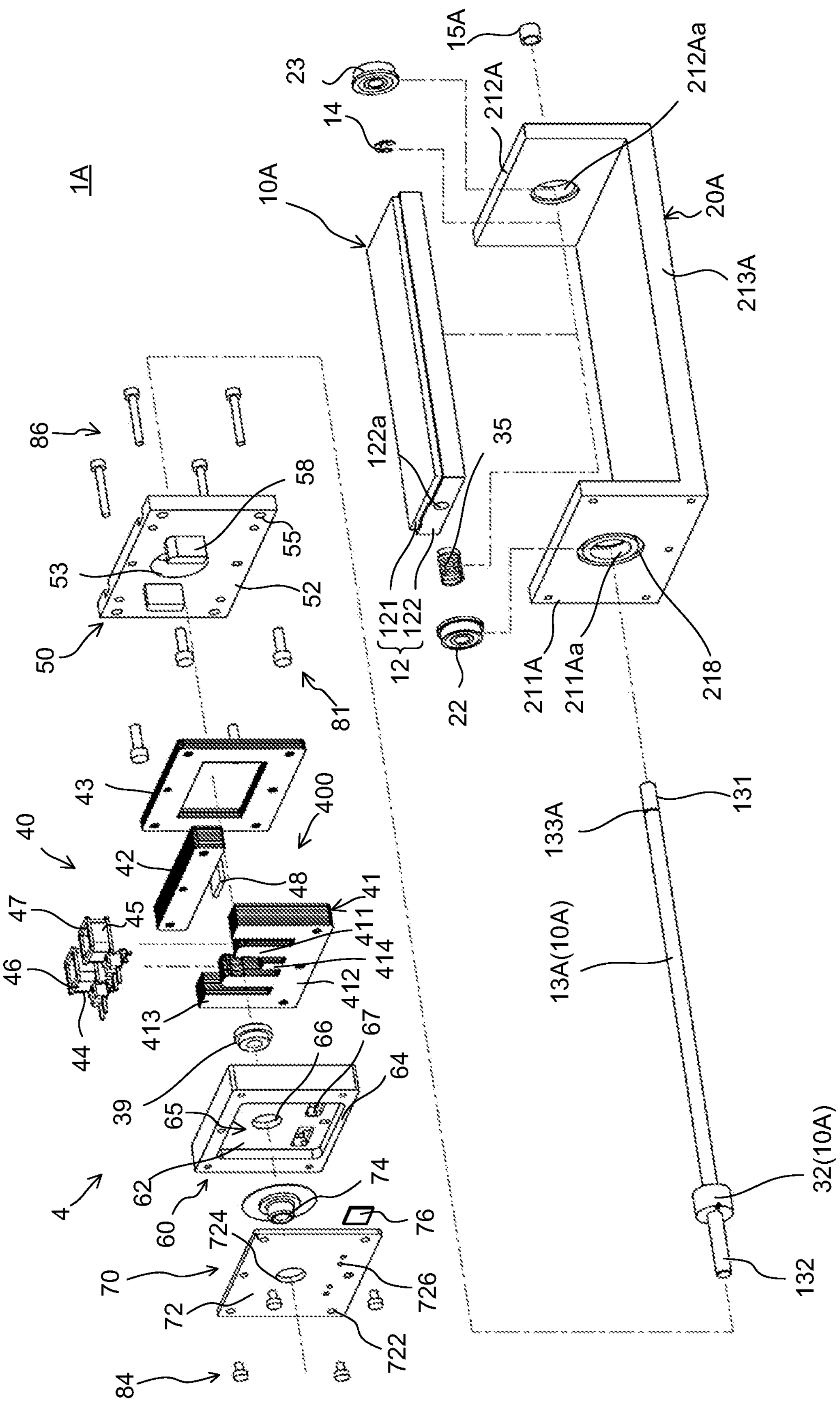
FIG. 22 is an exploded perspective view of Variation 1 of the rotary reciprocating drive actuator.

FIG. 21 is a longitudinal sectional view illustrating Variation 1 of the rotary reciprocating drive actuator, and FIG. 22 is an exploded perspective view of Variation 1 of the rotary reciprocating drive actuator.

In rotary reciprocating drive actuator 1A of Variation 1, the directions of bearings 22 and 23 attached to base portion 21A and the positions of preload spring 35, stopper portion 15A, and retaining portion 14 are different from those of rotary reciprocating drive actuator 1, and the remaining configurations are the same. Therefore, the same names having the same functions are denoted by the same reference numerals, and description thereof will be omitted, and only differences will be described.

In rotary reciprocating drive actuator 1A, movable body 10A is attached to base portion 21A to form main body unit A, and rotary reciprocating drive actuator 1A includes driving unit 4 at wall portion 211 which is one end portion of main body unit 2.

Rotary reciprocating drive actuator 1A has preload spring 35 disposed between bearing 22 and mirror holder 122 as compared with rotary reciprocating drive actuator 1.

In base portion 21A, bearings 22 and 23 whose flanges are disposed on the axially inner side of wall portions 211A and 212A are disposed at respective central portions of a pair of wall portions 211A and 212A extending upright from the opposite end portions of bottom portion 213 spaced apart from each other in the extending direction. For example, bearings 22 and 23 are press-fitted into insertion holes 211Aa and 212Aa from the inner side in the axial direction. Rotation shaft 13 is inserted through bearings 22 and 23.

Further, stopper portion 15A is shorter than stopper portion 15, and is attached to the base end portion of rotation shaft 13 from the outer side of base portion 21A.

Further, at the inner side of wall portion 212, retaining portion 14 is fitted into fitting groove 133A in an end portion of rotation shaft 13A inserted through wall portion 212A.

In this configuration, when a load is applied to rotation shaft 13A from the axially outer side of stopper 15A, in other words, from the base end portion (one end portion 131) side of rotation shaft 13A, the position of rotation shaft 13A is held by stopper 15A. In addition, also when the force of preload spring 35 is applied, the position is held by retaining portion 14, and the function of preload spring 35 in rotary reciprocating drive actuator 1 has the same function. Thus, the same effect can be obtained.

That is, movable body 10A has a configuration in which an outward preload is applied on the opposite sides in the axial direction, and preload spring 35 is disposed in the vicinity of a movable object. Accordingly, since preload spring 35 is disposed in a dead space of rotation shaft 13 disposed between the pair of wall portions (both side wall portions) 211A and 212A of base portion 21A, it is possible to achieve the height reduction and the size reduction as compared with a configuration in which preload spring 35 is disposed in driving unit 4.

<Variation 2>

Figure 23:
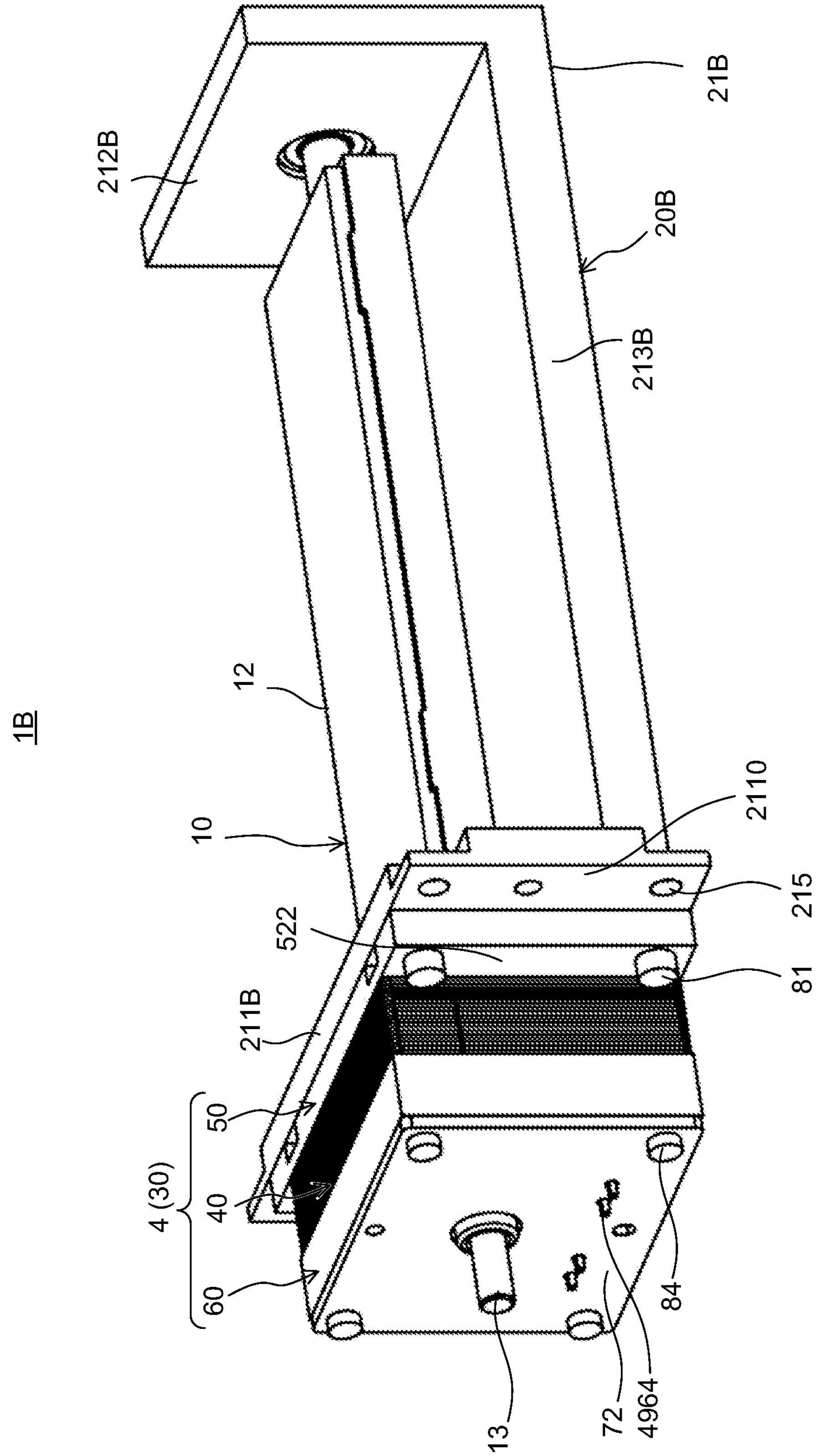
FIG. 23 is an external perspective view of Variation 2 of the rotary reciprocating drive actuator.
Figure 24:
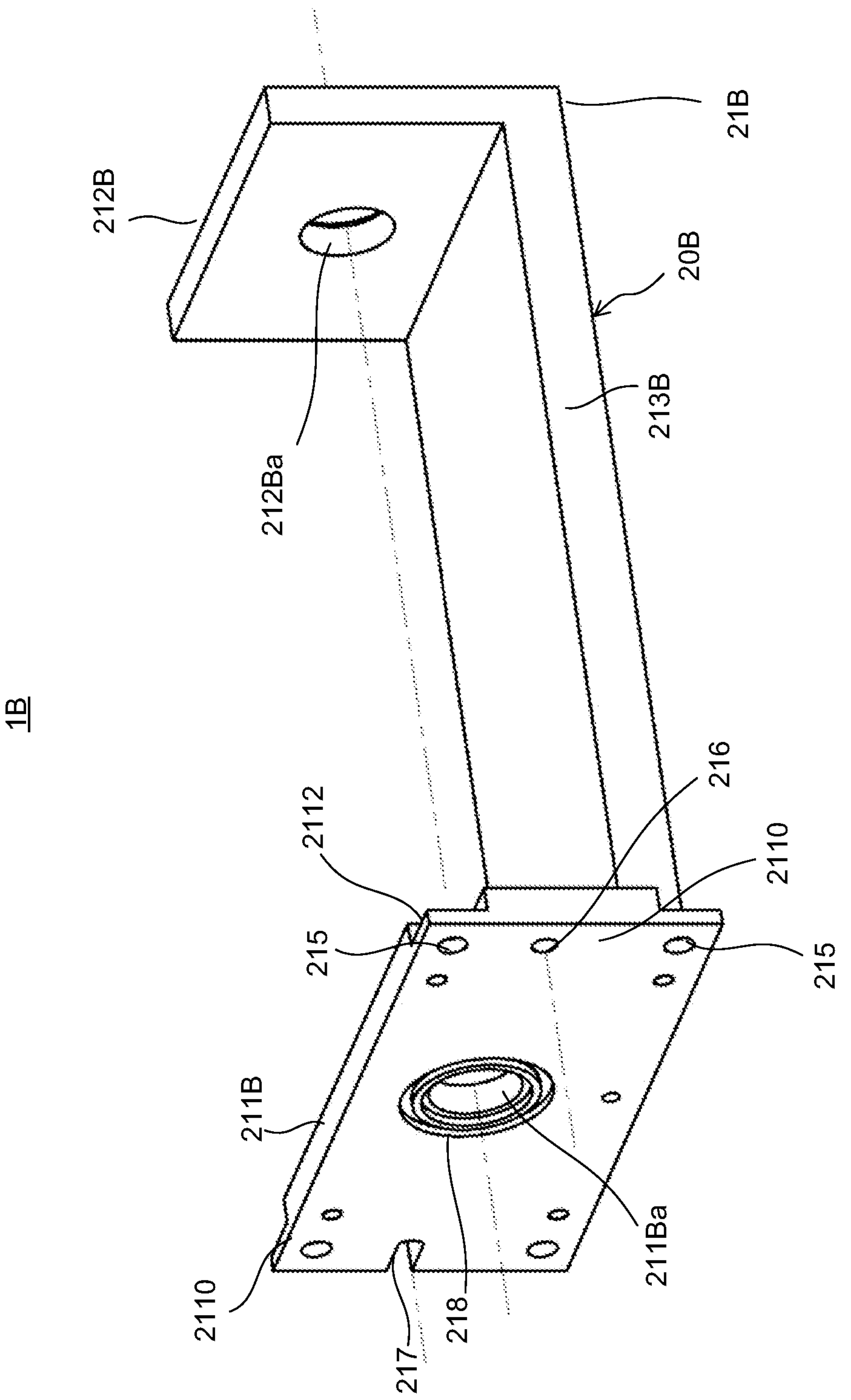
FIG. 24 is a perspective view of a main body unit of Variation 2 of the rotary reciprocating drive actuator.
Figure 25:
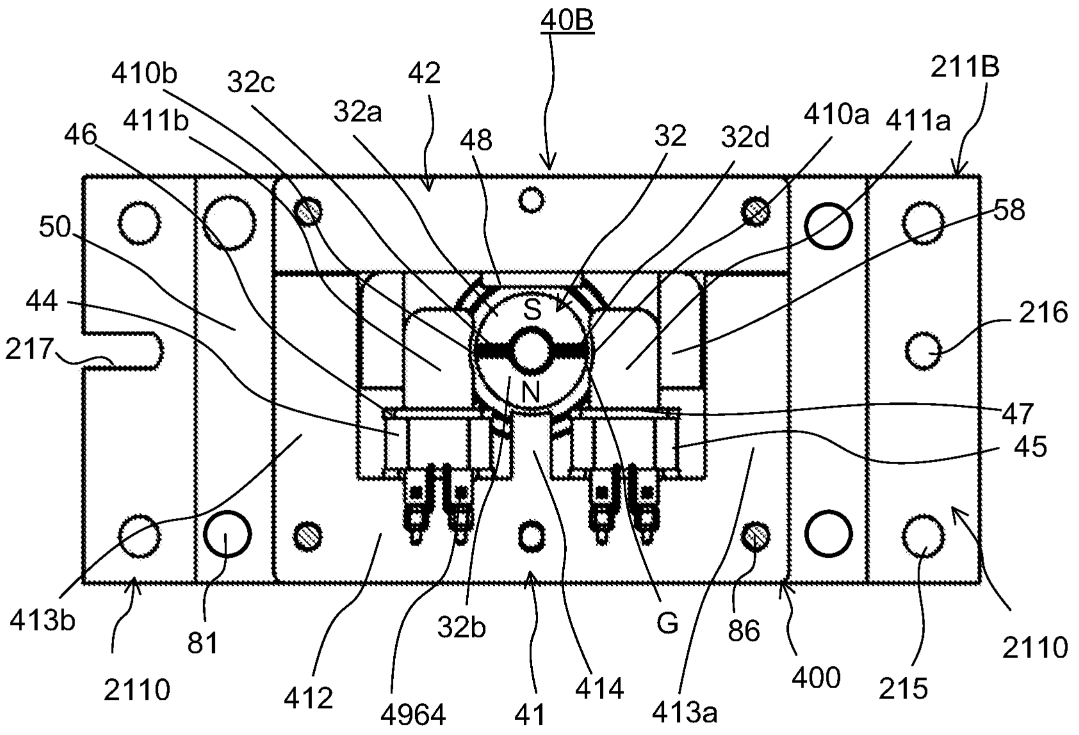
FIG. 25 is a front view illustrating a principal part configuration of a driving unit in Variation 2 of the rotary reciprocating drive actuator.
Figure 26:
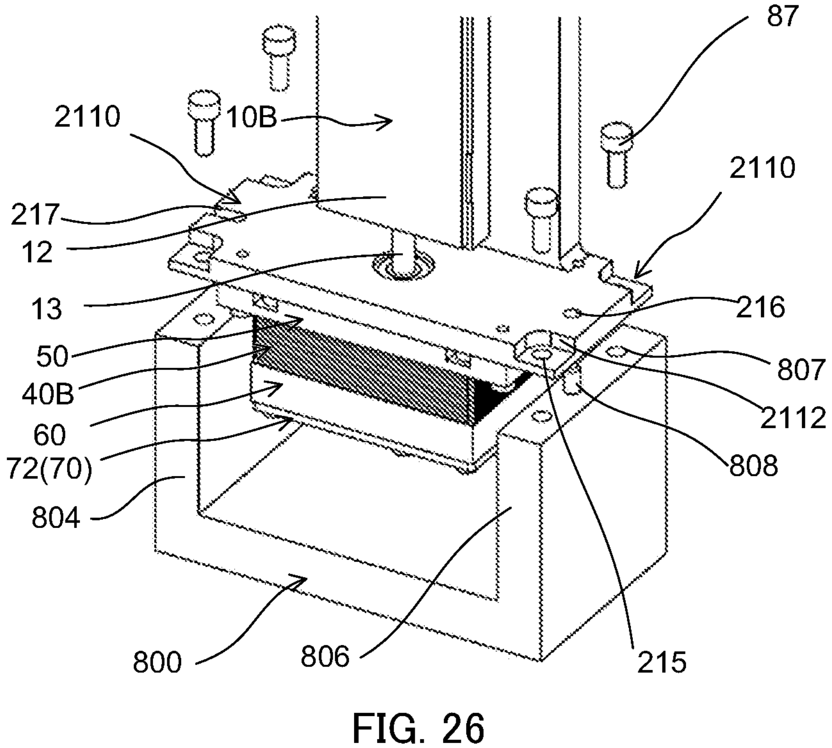
FIG. 26 is a perspective view of Variation 2 of the rotary reciprocating drive actuator attached to a product.

FIG. 23 is an external perspective view of Variation 2 of the rotary reciprocating drive actuator, and FIG. 24 is a perspective view of the main body unit of Variation 2 of the rotary reciprocating drive actuator. FIG. 25 is a front view illustrating a principal part configuration of a driving unit in Variation 2 of the rotary reciprocating drive actuator, and FIG. 26 is a perspective view of Variation 2 of the rotary reciprocating drive actuator attached to a product.

Rotary reciprocating drive actuator 1B illustrated in FIGS. 23 to 26 has the same function as that of rotary reciprocating drive actuator 1, and includes fixing holes 215 as an actuator fixing part for fixation to fixing base portion 800 of a frame of a product.

Fixing holes 215 are disposed, for example, in wall portion 211B of base portion 21B of fixing body 20B having substantially the same function as fixing body 20. Fixing holes 215 are formed in opposite lateral protruding side portions 2110 of a flange-like shape extending in the direction perpendicular to the axial direction from a portion of wall portion 211B to which driving unit 4 is fixed. Note that fixing holes 215 may be formed in one lateral protruding side portion of opposite lateral protruding side portions 2110.

Opposite lateral protruding side portions 2110 are disposed to be adjacent to each other on the left and right sides of driving unit 4 when viewed from the front. Opposite lateral protruding side portions 2110 are disposed on the outer side of the opposite side portions (left and right outer sides in front view) of attachment portion 522 of bottom cover 50 of driving unit 4 that are attached to wall portion 211B via fastening members 81.

In the rear surface side of opposite lateral protruding side portions 2110, spot-facing portions 2112 are disposed around fixing holes 215, and head portions of fastening members 87 are formed so as not to protrude from wall portion 211B in the axial direction.

Wall portion 211B includes positioning cutout portion 217 and positioning hole 216 that enable positioning when driving unit 4 is attached to a housing (for example, fixing base portion 800) of a product. Positioning cutout portion 217 is disposed in an outer edge of wall portion 211B, for example, in a central portion of one of opposite lateral protruding side portions 2110. In wall portion 211B, positioning hole 216 and positioning cutout portion 217 are disposed at position symmetrical with respect to the center portion as a center.

When rotary reciprocating drive actuator 1B is attached to a frame of a product, rotary reciprocating drive actuator 1B is fixed to fixing base portion 800 disposed on the frame side (for example, as a part of the frame).

Fixing base portion 800 is formed as a U-shaped portion having fixing wall portions 804 and 806 that are spaced apart from each other, face each other, and extend upright. Rotary reciprocating drive actuator 1B is fixed to fixing base portion 800 so that driving unit 4 is positioned inside the U-shape. Rotary reciprocating drive actuator 1B is fastened to the upper end surfaces of fixing wall portions 804 and 806 by fastening members 87 inserted through fixing holes 215, by bringing opposite lateral protruding side portions 2110 of wall portion 211B into contact with the upper end surfaces of fixing wall portions 804 and 806 in a state where the upright extension direction of fixing base portion 800 and the axial direction parallel to each other. Note that, in addition to fastening holes 807 to which fastening members 87 are inserted, positioning projections 808 to be inserted into positioning holes 216 are disposed on the upper end surfaces of fixing wall portions 804 and 806.

When rotary reciprocating drive actuator 1B is attached to fixing base portion 800, positioning projections 808 parallel to the axis are inserted into positioning holes 216 parallel to the axis, and the positions of rotary reciprocating drive actuator 1B and fixing base portion 800 are adjusted by rotation around the axis or the like. A rod or the like can be inserted into positioning cutout portion 217 to further adjust the position. Accordingly, fixing holes 215 and fastening holes 807 can be aligned to each other and fastening members 87 can be inserted into and fixed to both of the holes.

Since the axial direction is the same direction as the axial direction of bearing 22 caused by the position of mirror part 12, rotary reciprocating drive actuator 1B can be accurately positioned and fixed to fixing base portion 800.

Further, positioning cutout portion 217, positioning hole 216, fixing holes 215 are disposed in wall portion 211B for holding mirror part 12. By using these, wall portion 211B is fixed to fixing base portion 800. Insertion hole 211*a* (coaxial with insertion hole 212*a*) that is an insertion hole for bearing 22 of rotation shaft 13 to which mirror holder 122 is fixed, and that is caused by the mirror position is formed in wall portion 211B. It is thus possible to perform positioning and fixation to fixing base portion 80 in the same processing plane as insertion hole 211*a* that determines the mirror position, so as to achieve fixation with high accuracy.

When the actuator fixing part is disposed on the driving unit 4 side, the actuator fixing part can be fixed to the frame of a product, that is, fixing base portion 800, in the vicinity of the center of gravity of the rotary reciprocating drive actuator. Accordingly, disturbance vibration or impact can be effectively suppressed. The actuator fixing part may be disposed on the top cover of driving unit 4.

<Variation 3>

Figure 27:
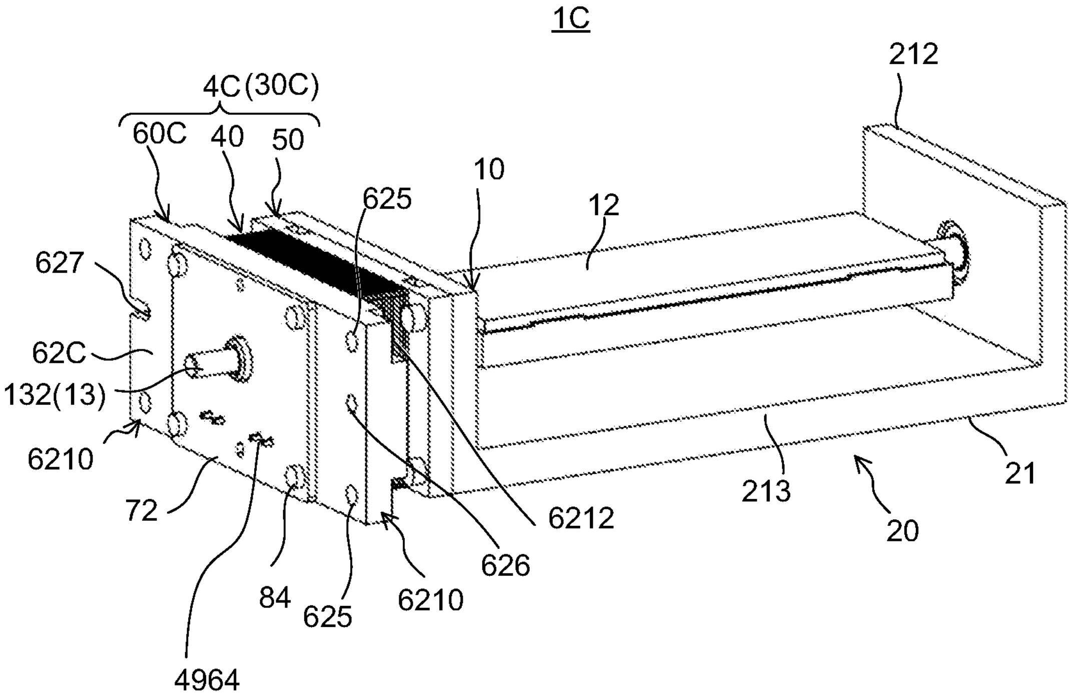
FIG. 27 is an external perspective view of Variation 3 of the rotary reciprocating drive actuator.
Figure 28:
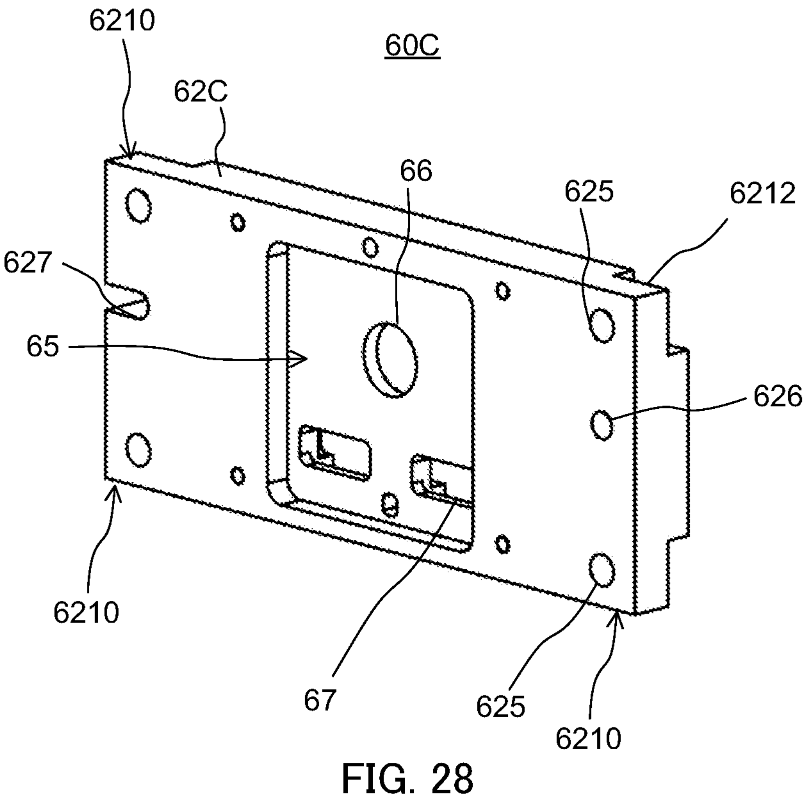
FIG. 28 is an external perspective view of a top cover of Variation 3 of the rotary reciprocating drive actuator.
Figure 29:
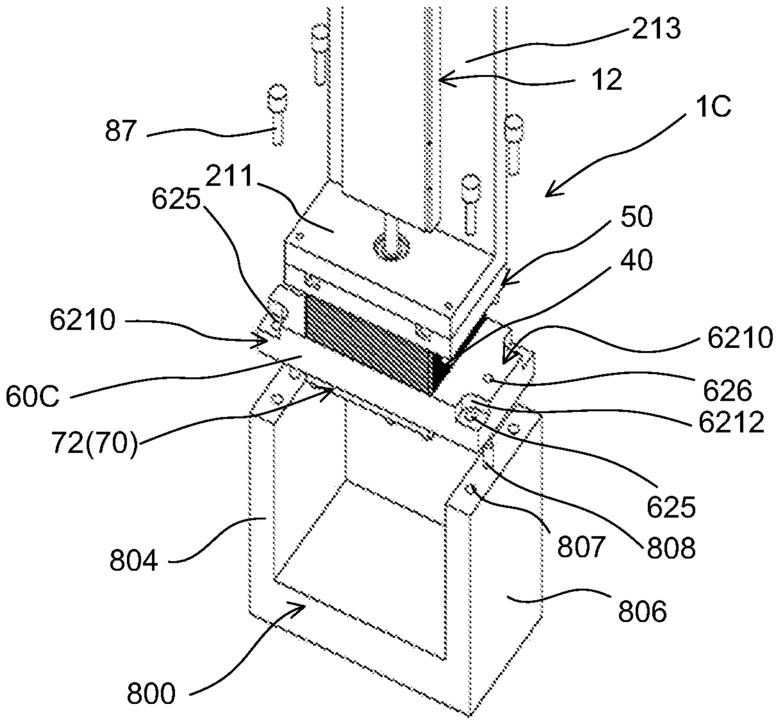
FIG. 29 is a perspective view illustrating Variation 3 of the rotary reciprocating drive actuator attached to the product.

FIG. 27 is an external perspective view of Variation 3 of the rotary reciprocating drive actuator, and FIG. 28 is an external perspective view of the top cover of Variation 3 of the rotary reciprocating drive actuator. FIG. 29 is a perspective view illustrating a Variation 3 of the rotary reciprocating drive actuator attached to a product.

Rotary reciprocating drive actuator 1C of Variation 3 illustrated in FIGS. 27 and 28 differs from rotary reciprocating drive actuator 1 only in top cover 60C, and the rest of the configurations is the same. Therefore, components similar to those of rotary reciprocating drive actuator 1 are denoted by the same reference numerals, and description thereof will be omitted.

Rotary reciprocating drive actuator 1C illustrated in FIGS. 27 and 28 has top cover 60C provided with fixing holes 625 as an actuator fixing part.

In top cover 60C, top cover main body 62C having a rectangular plate shape is provided with opposite lateral protruding side portions 6210 extending in a direction perpendicular to the axial direction in the same manner as in wall portion 211B of Variation 2. Opposite lateral protruding side portions 6210 are provided with fixing holes 625 extending in parallel to the axial direction. In top cover 60C, similarly to top cover 60, recessed sensor housing 65 of the top cover and a recessed portion are formed respectively in the front surface side and the rear surface side of the top cover. Recessed sensor housing 65 and the recessed portion have the same function as the sensor housing and the recessed portion of top cover 60.

In the rear surface side of each of opposite lateral protruding side portions 6210 of top cover main body 62C, spot-facing portion 6212 having a configuration in which the periphery of fixing hole 625 is cut out is formed continuously to fixing hole 625. Spot-facing portion 6212 prevents the head portion of fastening member 87 (see FIG. 29) inserted into driving unit 4C from projecting from wall portion 211B in the axial direction. In sensor housing 65, through-hole 66 and bobbin engaging holes 67 are formed, and sensor housing 65 is covered with sensor board 72.

Further, top cover main body 62C is provided with positioning hole 626 and positioning cutout portion 627 having the same function as in wall portion 211B. Positioning cutout portion 627 is disposed in the outer edge, for example, at the center portion of one lateral protruding side portion 6210. In top cover main body 62C, positioning cutout portion 627 and positioning hole 626 are formed at positions symmetrical with respect to the center portion as a center.

In rotary reciprocating drive actuator 1C, fixing holes 625, which are an actuator fixing part, are disposed in top cover 60C of driving unit 4C. Thus, as illustrated in FIG. 29, rotary reciprocating drive actuator 1C is fixed to the pair of fixing wall portions 804 and 806 of a recessed portion of fixing base portion 800 by inserting fastening members 87 in a direction parallel to the axial direction into fixing holes 625 and fastening holes 807 and by fastening the fastening members.

At this time, since fixation to fixing base portion 800 is made by top cover 60C, highly accurate fixation is possible without inserting driving unit 4C between fixing wall portions 804 and 806.

Further, since driving unit 4C is fixed to fixing base portion 800, rotary reciprocating drive actuator 1C is fixed, at a position close to the center of gravity thereof, to fixing base portion 800. Thus, disturbance vibrations and/or impacts can be effectively damped.

In top cover 60C, positioning hole 626 and positioning cutout portion 627 are formed to extend in the axial direction. By inserting positioning projection 808 on the upper end surface of fixing wall portion 806 into positioning hole 626 and inserting another positioning projection into positioning cutout portion 627, both sides can be positioned before fixed.

Further, when rotary reciprocating drive actuator 1C is attached to fixing base portion 800, positioning projection 808 parallel to the axis can be inserted into positioning hole 626 parallel to the axis. Then, the positions of rotary reciprocating drive actuator 1C and fixing base portion 800 can be adjusted by rotating rotary reciprocating drive actuator 1C around the positioning projection, and it is thus possible to perform position adjustment more accurately by inserting a rod or the like into positioning cutout portion 627.

<Variation 4>

Figure 30:
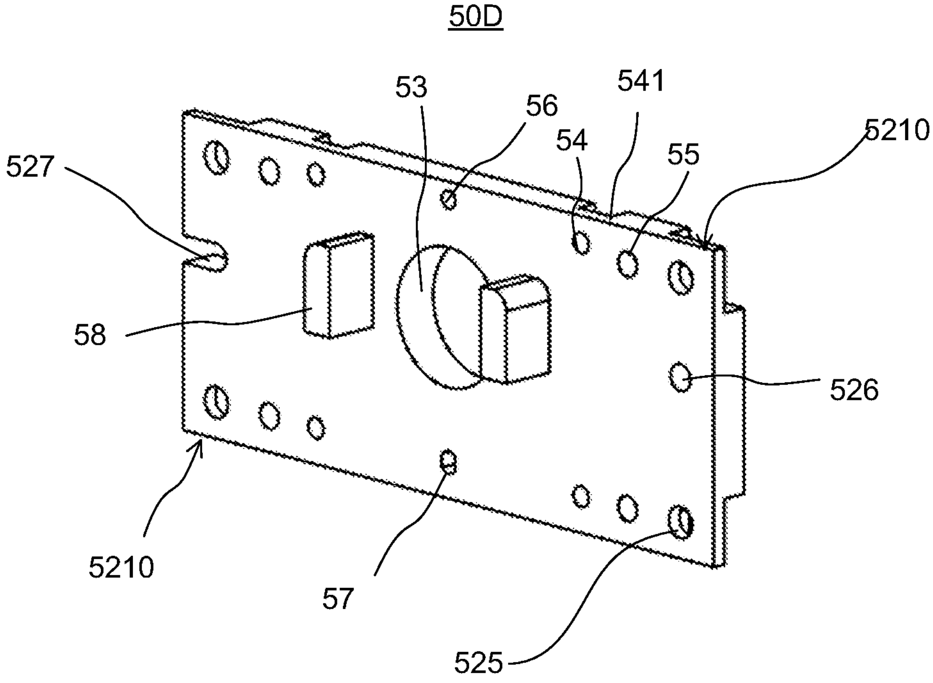
FIG. 30 is an external perspective view of a bottom cover of Variation 4 of the rotary reciprocating drive actuator.
Figure 31:
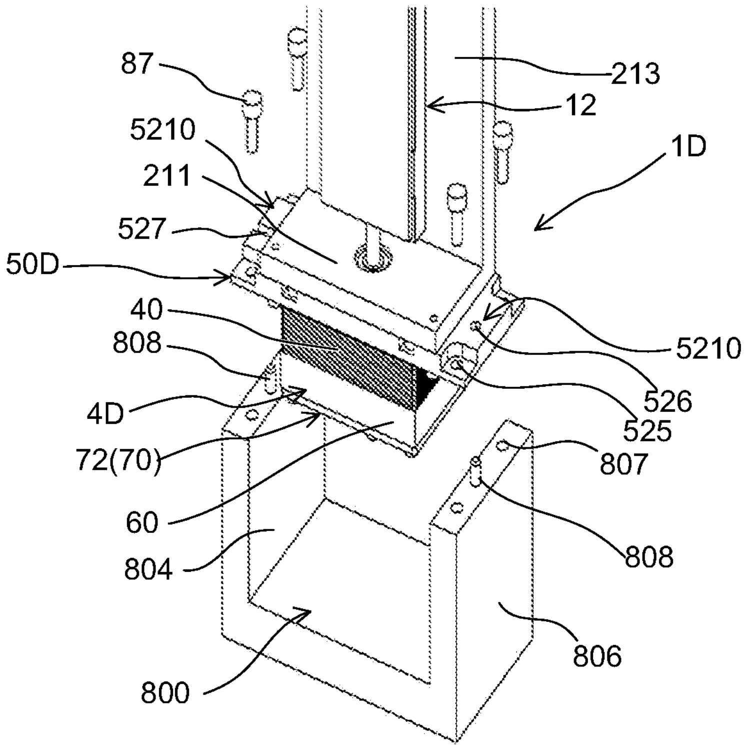
FIG. 31 is a perspective view illustrating Variation 4 of the rotary reciprocating drive actuator attached to the product.

FIG. 30 is an external perspective view of a bottom cover of Variation 4 of the rotary reciprocating drive actuator, and FIG. 31 is a perspective view illustrating Variation 4 of the rotary reciprocating drive actuator attached to a product.

In rotary reciprocating drive actuator 1D of Variation 4, fixing holes 525 which are an actuator fixing part are disposed in bottom cover 50D of driving unit 4. Rotary reciprocating drive actuator 1D differs from rotary reciprocating drive actuator 1 only in the configuration of bottom cover 50D, and the remaining components are the same. Therefore, only different points will be described, and the same reference numerals will be given to the same components, and description thereof will be omitted.

As illustrated in FIG. 30, bottom cover 50D is similar to bottom cover 50, and has, on opposite sides of rectangular plate-shaped cover main body 52 having opening portion 53 at the center thereof, opposite lateral protruding side portions 5210 projecting in a direction perpendicular to the axial direction in the same manner as in wall portion 211B of Variation 2.

Opposite lateral protruding side portions 5210 are portions projecting outward from driving unit 4, and include fixing holes 525 extending in parallel to the axial direction. In bottom cover 50D, as in the case of bottom cover 50, a positioning projection (not illustrated) is disposed to project from the rear surface of bottom cover 50D. The positioning projection is engaged with and positions recessed portion 218 in wall portion 211 of base portion 21.

As illustrated in FIG. 31, rotary reciprocating drive actuator 1D having bottom cover 50D is fixed to the pair of fixing wall portions 804 and 806 of a recessed portion of fixing base portion 800 by inserting fastening members 87 in a direction parallel to the axial direction into fixing holes 525 and fastening holes 807 and by fastening the fastening members.

At this time, since the fixation to fixing base portion 800 is made by bottom cover 50D, the fixation can be easily and accurately performed in a state where top cover 60 and core assembly 40 of driving unit 4C are disposed between fixing wall portions 804 and 806 and shortening in the axial direction is achieved.

Further, since driving unit 4D is fixed to fixing base portion 800, rotary reciprocating drive actuator 1D is fixed, at a position close to the center of gravity thereof, to fixing base portion 800. Thus, disturbance vibrations and/or impacts can be effectively damped.

In particular, rotary reciprocating drive actuator 1D is fixed to fixing base portion 800 by bottom cover 50D disposed between core assembly 40 and mirror part 12. As a result, the fixation is performed to fixing base portion 800, with the center of gravity being situated between core assembly 40 and mirror part 12. Stable holding can thus be performed.

In bottom cover 50D, positioning hole 526 and positioning cutout portion 527 are formed to extend in the axial direction. Thus, positioning projection 808 on the upper end surface of fixing wall portion 806 can be inserted into positioning hole 526, and another positioning projection 808 can be inserted into positioning cutout portion 527. In this way, it is possible to accurately position both sides via fastening holes 807 and fixing holes 525 before fixing both sides.

Further, when rotary reciprocating drive actuator 1D is attached to fixing base portion 800, the their positions can be adjusted by inserting positioning projections 808 parallel to the axis into positioning holes 216 parallel to the axis, and by rotation around the axis. In addition, it is possible to insert a rod or the like into positioning cutout portion 217 to perform position adjustment with higher accuracy.

FIG. 32 is a block diagram illustrating a configuration of a principal part of scanner system 100 using rotary reciprocating drive actuator 1.

Scanner system 100 includes one of rotary reciprocating drive actuators 1 and 1A to 1D, and includes laser beam emitting part 101, laser control part 102, drive signal supply part 103, and position control signal calculation part 104 in addition to rotary reciprocating drive actuators 1 and 1A to 1D.

Laser beam emitting part 101 includes, for example, a Laser Diode (LD) serving as a light source, and a lens system for focusing the laser beam output by the light source. Laser control part 102 controls laser beam emitting part 101. A laser beam emitted by laser beam emitting part 101 is incident on mirror 121 of rotary reciprocating drive actuator 1.

With reference to an angular position of rotation shaft 13 (mirror 121) obtained by angle sensor part 70 and a target angle position, position control signal calculation part 104 generates and outputs a drive signal for controlling rotation shaft 13 (mirror 121) such that the mirror comes to the target angle position. For example, position control signal calculation part 104 generates a position control signal based on the obtained angular position of rotation shaft 13 (mirror 121) and a signal indicating the target angle position as converted using a saw waveform data or the like stored in a waveform memory (not illustrated). Position control signal calculation part 104 outputs the generated position control signal to drive signal supply part 103.

Based on the position control signal, drive signal supply part 103 supplies, to coils 44 and 45 of rotary reciprocating drive actuator 1, a drive signal such that the angular position of rotation shaft 13 (mirror 121) comes to the desired angular position. Thus, scanner system 100 can emit scanning light from rotary reciprocating drive actuator 1 to a predetermined scanning region.

SUMMARY

As described above, rotary reciprocating drive actuator 1 according to the present embodiment includes movable body 10 including rotation shaft (shaft part) 13 to which the mirror part (movable object) is connected, and magnet 32 fixed to rotation shaft 13. Magnet 32 is a ring-type magnet in which S pole 32*a* and N pole 32*b* are alternately disposed on the outer circumferential surface in the circumferential direction. In addition, rotary reciprocating drive actuator 1 includes fixing body 20 including core assembly 40.

Preload spring 35 for applying a preload to bearing 22 is externally fitted to rotation shaft 13. Preload spring 35 is disposed, for example, on rotation shaft 13 between magnet 32 (specifically, annular receiving portion 37 fixed to rotation shaft 13 integrally with magnet 32) and bearing 22.

The opposite end portions of preload spring 35 make contact with annular receiving portion 37 and bearing 22 to prevent direct impact from being applied to magnet 32. That is, annular receiving portion 37 functions as a stopper to prevent an unnecessary load from being applied to magnet 32 and to improve the reliability of driving even when preload spring 35 receives an external impact or the like and absorbs it.

In addition, since the preload to bearing (e.g., ball bearing) 22 is steadily applied, rotation shaft 13 can be made to rotate with little sliding on bearing 22 and high reliability. As described above, according to rotary reciprocating drive actuator 1, it is possible to improve the rotational accuracy and to perform highly reliable driving with little sliding by improving the rigidity of a shaft.

Further, preload spring 35 is disposed inside rotary reciprocating drive actuator 1, and is never affected form the outside of rotary reciprocating drive actuator 1. Thus, with regard to the design of the rotary reciprocating drive actuator, quantitative management is made possible, and it is possible to design a steady preload.

Further, sensor board 72 covers the circumference of a detection part (encoder disk) of a sensor component together with magnet 32 at the outside of driving part 30 (core body 400 and magnet 32). As a result, sensor board 72 can prevent contamination of sensor housing 65 and thus of air gap G between the magnet and core body 400. It is thus possible to prevent the foreign matter from being mixed into air gap G, thereby preventing the malfunction, and thus suitable driving is made possible.

Further, since magnet 32 is disposed inside driving unit 4 of the rotary reciprocating drive actuator, the magnet is not disposed on the outside. The magnetic flux is thus not distributed to the outside (front side). It is possible to reduce the leakage magnetic flux to the front side. Placeability is thus achieved even when there is a product susceptible to the magnetism in the vicinity.

Core assembly 40 of driving unit 4 has a block shape of a rectangular frame shape. Thus, even in a limited installation space of core assembly 40 (for example, a rectangular region (region as seen in the axial direction) of the wall surface of wall portion 211 of base portion 21), accommodation of the core assembly in the rectangular region is possible, and it is possible to secure a sufficient magnetic path length to drive movable body 10 at a high amplitude.

Further, when angle sensor part 70 is maintained, sensor component which is an expensive component can be exposed to the outside only by removal of fastening members 84 at the time of malfunction. It is thus possible to easily perform repair or replacement.

In addition, when the sensor part is an optical sensor, interference of light with sensor housing 65 can be prevented without using a separate light shielding member.

When driving unit 4 is fixed to main body unit 2 with reference to rotation shaft 13, it is desirable to fix the driving unit at a position where the dimensions can be defined from the reference. In addition, when the rotary reciprocating drive actuator is fixed to the housing of a product in a state where the shaft is erected vertically, assembly and attachment of the rotary reciprocating drive actuator can be performed by positioning and fixation thereof in a direction parallel to the shaft. It is thus possible to perform highly accurate positioning and fixation with less frequent superimposed dimensioning than in the case of assembly in a direction different from the axial direction.

Further, as illustrated in FIGS. 4, 11, and 13, in driving unit 4 of rotary reciprocating drive actuator 1, the through-holes into which fastening members 86 for fastening bottom cover 50, core assembly 40, and top cover 60 are inserted, and the through-holes into which fastening members 81 for fastening top cover 60 and sensor board 72 are inserted are coaxial through-holes extending in parallel with the axial direction. That is, in fastening sensor board 72, the screw holes (through-holes) used for fixing driving unit 4 are used in common. Thus, no additional screw hole is required to fix sensor board 72. It is thus possible to reduce the cost.

Impact-resistant bushing 39 is disposed adjacently to a rotary encoder or the like, which is a sensor component. Accordingly, even when rotation shaft 13 vibrates due to disturbance such as an impact received by rotary reciprocating drive actuator 1, bushing 39 receives the impact to make it possible to prevent the sensor component from receiving the impact.

Further, a gap (clearance) narrower than air gap G and G1 between magnet 32 and core assembly 40 may be provided between bushing 39 and the outer circumference of rotation shaft 13. In this case, sliding between bushing 39 and rotation shaft 13 is eliminated, and impact resistance can be secured. Further, when bushing 39 and rotation shaft 13 are configured to slide, it is possible to reliably receive an impact, to prevent the impact on the sensor part, to damp unnecessary vibration of the movable body, and to reduce noise.

The movable object is mirror part 12 (particularly, mirror 121) that reflects scanning light. Thus, rotary reciprocating drive actuator 1 can be used for use in a scanner that performs optical scanning.

Figure 33A:
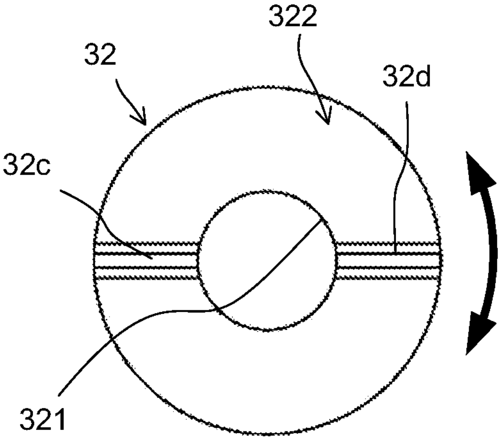
FIGS. 33A and 33B are a front view and a right side view of Variation 1 of a magnet.
Figure 33B:
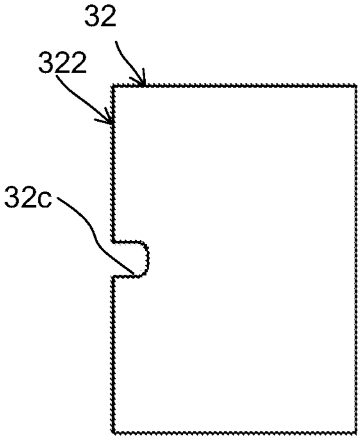
Figure 34A:
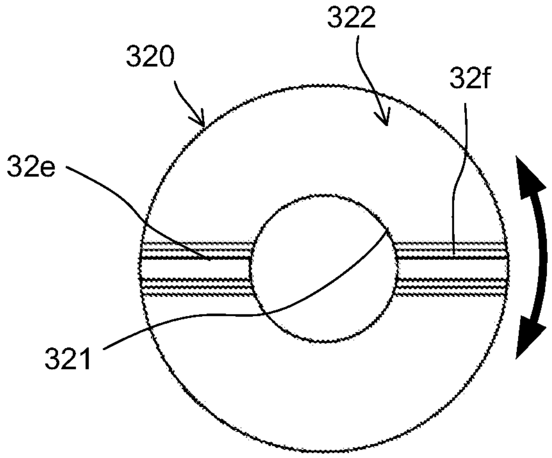
FIGS. 34A and 34B are a front view and a right side view of Variation 2 of the magnet.
Figure 34B:
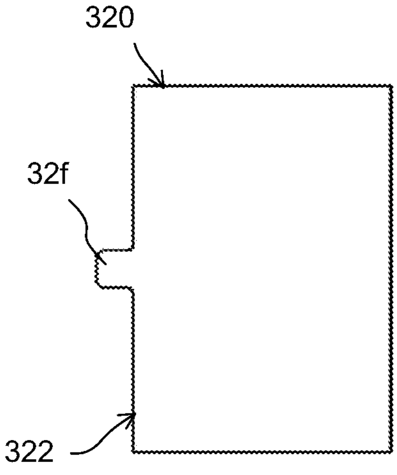

Further, in ring-shaped magnet 32 of rotary reciprocating drive actuators 1 and 1A to 1D of the present embodiment, magnetic pole switching portions 32*c* and 32*d* are formed as a U-shaped groove formed in one end face 322 as illustrated in FIGS. 33A and 33B, but do not need to be formed as a U-shaped groove. The magnetic pole switching portions may be configured in any form as long as the magnetic pole switching portions indicate a position in magnet 32 at which the magnetic poles are switched. A variation of magnet 32 will be described with reference to FIGS. 33A, 33B, 34A, 34B, 35A, 35B, 36A, 36B, and 37.

Figure 35A:
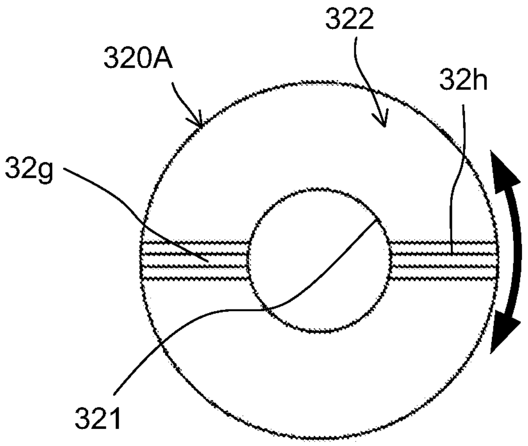
FIGS. 35A and 35B are a front view and a right side view of Variation 3 of the magnet.
Figure 35B:
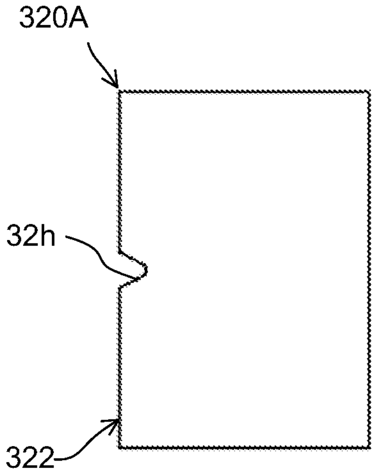
Figure 36A:
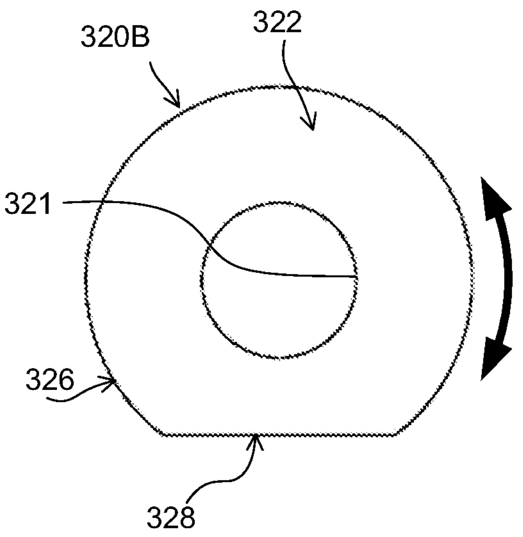
FIGS. 36A and 36B are a front view and a right side view of Variation 4 of the magnet.
Figure 36B:
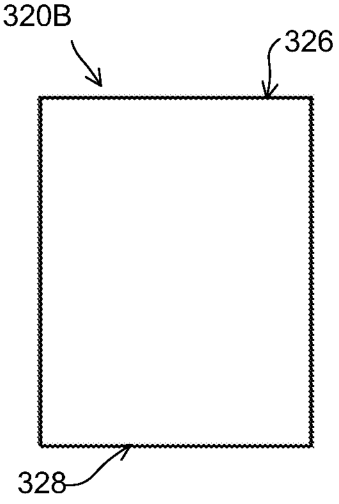
Figure 37:
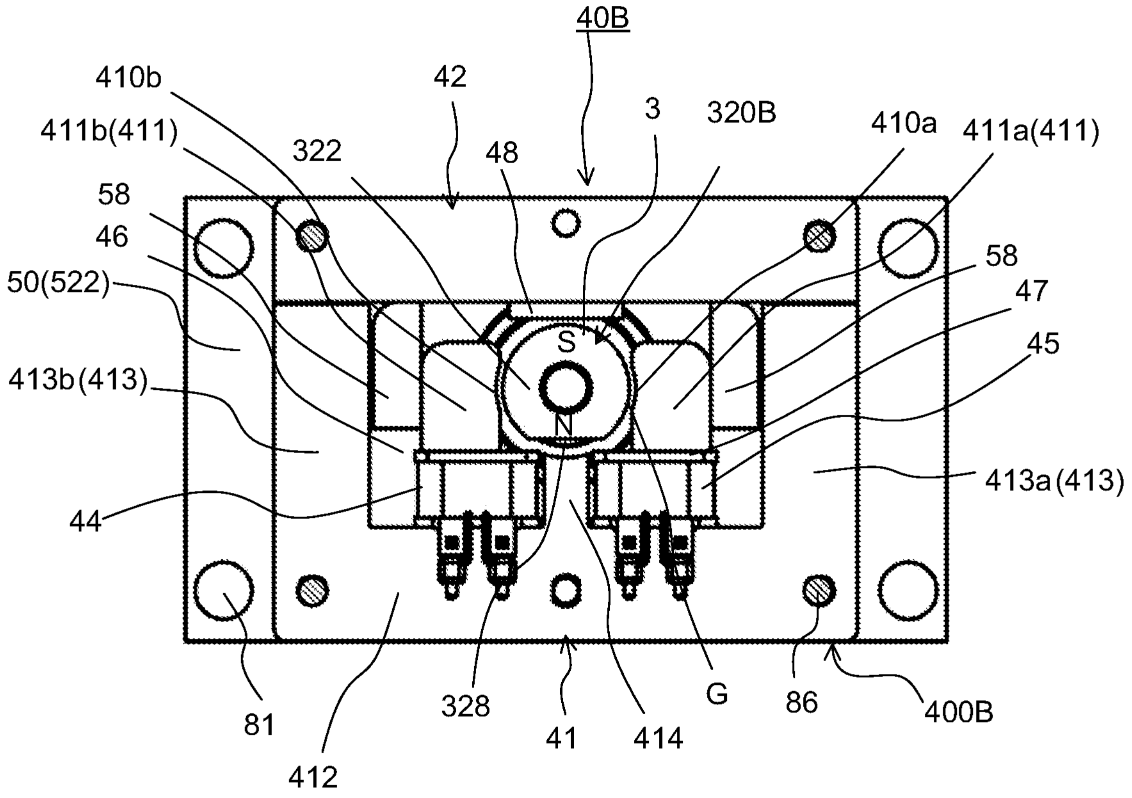
FIG. 37 illustrates a core assembly of the rotary reciprocating drive actuator having Variation 4 of the magnet.

FIGS. 33A, 33B, 34A, 34B, 35A, 35B, 36A, 36B, and 37 illustrate Variations 1 to 4 of the magnet of rotary reciprocating drive actuators 1 and 1A to 1D. FIGS. 34A, 34B, 35A, 35B, 36A, and 36B are front views and right side views of the magnet as the variations, respectively, and FIG. 37 illustrates a core assembly of a rotary reciprocating drive actuator including Variation 4.

Magnets 320, 320A, and 320B illustrated in FIGS. 34A, 34B, 35A, 35B, 36A, and 36B are formed in a ring shape including, at the center, opening portion 321 through which rotation shaft 13 or 13A is inserted. Magnet 320 illustrated in FIGS. 34A and 34B integrally includes protruding magnetic pole switching portions 32*e* and 32*f* on a diametral portion of one end face 322.

Magnetic pole switching portions 32*e* and 32*f* make it possible to determine switching positions of the magnetic poles in magnet 320 based on the shape of magnet 320.

Further, magnet 320A illustrated in FIGS. 35A and 35B includes magnetic pole switching portion 32*g* having a V-shaped cross section instead of a U-shaped cross section in end face 322 of the ring-shaped main body.

Magnetic pole switching portions 32*g* and 32*f* make it possible to determine switching positions of the magnetic poles in magnet 320 based on the shape of magnet 320A.

Here, for the assembling accuracy of assembling magnet 320 or 320A in the magnetic pole direction, well-balanced arrangement in accordance with an angle reference of mirror part 12 which is a movable object and an angle reference of angle sensor 70 is desirable. When a deviation occurs in each of the angle references, there is a problem that a change in characteristics occurs due to a rotational angle of rotation shaft 13, which causes a performance variation.

In this respect, in magnets 32, 320, and 320A in the present embodiment, magnetic pole switching portions 32*c* to 32*h* are formed in a U-shape, a protruding shape, a V-shape, and the like, and magnets 32, 320, and 320A have shapes that protrude or are recessed in the magnetization direction.

Therefore, by using a positioning jig having a pin corresponding to a U-shape, a protruding shape, a V-shape, or the like, it is possible to attach other components or the like or to assemble the rotary reciprocating drive actuator with reference to magnetic pole switching portions 32*c*, 32*d*, 32*e*, 32*f*, 32*g*, and 32*h*.

That is, it is possible to adjust the positional relationship between the components fixed to rotation shaft 13 with reference to the protruding and recessed portions at the time of assembling or maintenance of rotary reciprocating drive actuator 1. The angle reference of mirror part 12, the angle reference of angle sensor part 70, and the references of the magnetic poles of magnet 32 can be easily aligned, and highly accurate assembly can be easily realized.

Further, in magnet 32, when the protrusion and recess are configured to be formed in the magnetization direction, an influence on magnetic poles 410*a* and 410*b* and rotational angle position holding portion (magnetic spring) 48 facing the outer circumferential surface is small, an influence on the torque is small, and further, variation in the property of the magnetic attraction force of rotational angle position holding portion 48 is prevented.

Magnet 320B illustrated in FIGS. 36A and 36B has flat surface 328 obtained by cutting out a part of outer circumferential surface 326. Flat surface 328 is disposed as a part of the outer circumferential surface of one of the different magnetic poles of magnet 320B.

For example, when core assembly 40B having magnet 320B is placed in rotary reciprocating drive actuator 1, the placement is such that magnetic pole 32*b* opposed to magnetic pole 32*a* facing rotational angle position holding portion 48 illustrated in FIG. 37 has flat surface 328. Flat surface 328 faces a curved surface of complementary pole portion 414. Specifically, when magnet 320B is at a reference position, flat surface 328 is disposed such that the lengthwise center in the circumferential direction (horizontal direction) and the center of complementary pole portion 414 in the circumferential direction (horizontal direction) are located on a line passing through the center of opening portion 321 (rotation shaft 13, 13A) and being perpendicular to flat surface 328.

In magnet 320B, for example, when flat surface 328 is disposed on the rotational angle position holding portion 48 side or on the core (magnetic pole 410) side, the flow of the magnetic flux generated is unbalanced since the flat surface is only one flat part of magnet 320B. Accordingly, the magnetic circuit properties may be affected, and/or the performance may be deteriorated.

In contrast, in the present embodiment, flat surface 328 of magnet 320B is disposed on the opposite side of rotational angle position holding portion 48, with rotation shaft 13 being interposed therebetween, when the magnet is in the non-energized state, for example, when the magnet is at the reference position. As a result, flat surface 328 can generate a magnetic attraction force between itself and complementary pole portion 414 while avoiding an influence on rotational angle position holding portion 48, that is, avoiding an imbalance in torque generation.

While the invention made by the present inventors has been specifically described based on the preferred embodiment, it is not intended to limit the present invention to the above-mentioned preferred embodiment, but the present invention may be further modified within the scope and spirit of the invention defined by the appended claims.

For example, the embodiment has been described in connection with the case where the movable object is mirror part 12, but the movable object is not limited to this. The movable object may be, for example, an imaging device such as a camera.

For example, while the embodiment has been described in connection with the case of resonantly driving rotary reciprocating drive actuator 1, the present invention is also applicable to the case of non-resonant driving.

The configuration of driving unit 4 is not limited to that described in the embodiment. For example, the core only needs to include the magnetic pole portions which are magnetically excited by energization of the coils to generate polarities, and only needs to be such that when the rotation shaft is attached to the fixing body, the magnetic pole portions and the outer circumferential surface of the magnet face each other via an air gap. Further, the coil only needs to be configured to generate a magnetic flux suitably from one of the magnetic pole portions of the core toward the other during energization.

Further, although rotational angle position holding portion 48 disposed in fixing body is attached to second core 42, the present invention is not limited thereto, and rotational angle position holding portion 48 may also be disposed on another component of fixing body 20. In these cases, rotational angle position holding portion 48 may be accommodated in second core 42.

The embodiment disclosed herein is merely an exemplification in every respect and should not be considered as limitative. The scope of the present invention is specified by the claims, not by the above-mentioned description. The scope of the present invention is intended to include all modifications in so far as they are within the scope of the appended claims or the equivalents thereof.

INDUSTRIAL APPLICABILITY

The present invention is suitable for, for example, a LiDAR apparatus, a scanner system, and the like.

REFERENCE SIGNS LIST

1, 1A, 1B, 1C, 1D Rotary reciprocating drive actuator
2 Main body unit
4, 4C, 4D Driving unit
10A Movable body
12 Mirror part
13, 13A rotation shaft
14 Retaining portion
15A Stopper portion
20 Fixing body
21, 21A, 21B Base portion
22, 23 Bearing
30 Driving part
32, 320, 320A, 320B Magnet
32*a*, 32*b*, 410*a*, 410*b* Magnetic pole
32*c*, 32*d*, 32*e*, 32*f*, 32*g*, 32*h* Magnetic pole switching portion
35, 350 Preload spring (preload applying part)
37 Annular receiving portion (annular retaining portion)
39 Bushing
40B Core assembly
41 First core
42 Second core
43 Third core
44, 45 Coil
46, 47 Bobbin
48 Rotational angle position holding portion
49 Coil body
50D bottom cover
52 Cover main body
53, 321 Opening portion
54, 55, 66 Through-hole
56, 216, 526, 626 Positioning hole
57 Position adjustment hole
58 Core holding projection
59, 808 Positioning projection
60C Top cover
62, 62C Top cover main body
64 Circumferential wall portion
65 Sensor housing
67 Bobbin engaging hole
70 Angle sensor part
72 Sensor board
74 Encoder disk (detection target portion)
76 Optical sensor
81, 84, 86, 87 Fastening member
100 Laser system
101 Laser beam emitting part
102 Laser control part
103 Drive signal supply part
104 Position control signal calculation part
121 Mirror
122 Mirror holder
122*a*, 211*a*, 211*b*, 211Aa, 212*a*, 211Aa, 212Aa, 211Ba, 212Ba Insertion hole
131 One end portion
132 Other end portion
133, 133A Fitting groove
211, 211A, 211B, 212, 212A Wall portion
213, 213A, 213B Bottom portion
215, 525, 625 Fixing hole
217, 527, 627 Positioning cutout portion
218 Recessed portion
212*a* Insertion hole
222, 232 Bearing main body
224, 234 Flange
322 End face
326 Outer circumferential surface
328 Flat surface
400 Core body
411, 411*a*, 411*b* Rod-shaped body
412 Connecting side portion

413, 413*a*, 413*b* Lateral side portion
414 Complementary pole portion
414 Reinforcing portion
492 Bobbin portion
494 Terminal support portion
496 Terminal
522 Attachment portion
541, 2112, 6212 Spot-facing portion
621 Depressed portion
726 Through-hole
800 Fixing base portion
804, 806 Fixing wall portion
807 Fastening hole
2110, 5210, 6210 Opposite lateral protruding side portion
4964 Other side portion
4962 One side portion

What is claimed is:

1. A rotary reciprocating drive actuator, comprising:

a movable body including a shaft part to which a magnet is fixed at an outer circumference thereof, the movable body being capable of performing a reciprocating rotation about an axis;

a base portion including a pair of wall portions for supporting the shaft part via a bearing such that the shaft part is rotatable;

a core assembly including:

a core body having a plurality of magnetic poles facing an outer circumference of the magnet to sandwich the magnet, a coil body that is wound around the core body and that is energized to generate a magnetic flux interacting with the magnet to cause a reciprocating rotation of the movable body, and a magnet position holding portion that generates a magnetic attraction force between the magnet position holding portion and the magnet to define a reference position of the reciprocating rotation; and a preload applying part that is externally fitted to the shaft part, and is configured to apply a preload to the bearing, wherein an annular receiving portion is fixed to the shaft part at a position between the bearing through which the shaft part is inserted and the magnet, the annular receiving portion being adjacent to the magnet; and wherein the preload applying part is arranged between the annular receiving portion and the bearing, and is configured to press the annular receiving portion and the bearing along the shaft part.

2. The rotary reciprocating drive actuator according to claim 1, wherein:

one end portion side of the shaft part is connected to a movable object between the pair of wall portions, and an other end portion side of the shaft part is inserted through the bearing of one wall portion of the pair of wall portions and is fixed to the magnet at an outside of the one wall portion, and the bearing of the one wall portion is a ball bearing, and the preload applying part is disposed between the bearing of the one wall portion and the magnet.

3. The rotary reciprocating drive actuator according to claim 1, wherein:

the bearing is a ball bearing including a flange engaged with each of the pair of wall portions in an axial direction, and the preload applying part is disposed to bias the bearing of one wall portion of the pair of wall portions from the flange side of the bearing in an engagement direction in which the bearing is engaged with the one wall portion.

4. The rotary reciprocating drive actuator according to claim 1, wherein the preload applying part is a cylindrical coil spring or a wave spring.

5. The rotary reciprocating drive actuator according to claim 1, wherein a number of poles of the plurality of magnetic poles is two.

6. The rotary reciprocating drive actuator according to claim 2, wherein the movable object is a mirror for reflecting scanning light.

* * * * *